United States Patent
Yu et al.

(10) Patent No.: US 12,287,643 B2
(45) Date of Patent: Apr. 29, 2025

(54) LEADER SELECTION IN V2X GROUP MANAGEMENT

(71) Applicant: QUALCOMM Incorporated, San Diego, CA (US)

(72) Inventors: Lan Yu, Beijing (CN); Dan Vassilovski, Del Mar, CA (US); Gene Wesley Marsh, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 17/904,243

(22) PCT Filed: Apr. 30, 2020

(86) PCT No.: PCT/CN2020/088455
§ 371 (c)(1),
(2) Date: Aug. 15, 2022

(87) PCT Pub. No.: WO2021/217632
PCT Pub. Date: Nov. 4, 2021

(65) Prior Publication Data
US 2023/0141127 A1    May 11, 2023

(51) Int. Cl.
*G05D 1/00* (2024.01)
*G08G 1/00* (2006.01)
*H04W 4/46* (2018.01)

(52) U.S. Cl.
CPC ......... *G05D 1/0295* (2013.01); *G05D 1/0293* (2013.01); *G08G 1/22* (2013.01); *H04W 4/46* (2018.02)

(58) Field of Classification Search
CPC ...... G05D 1/0295; G05D 1/0293; G08G 1/22; G08G 1/162; G08G 1/164; G08G 1/166;
(Continued)

(56) References Cited

U.S. PATENT DOCUMENTS 8,520,695 B1 * 8/2013 Rubin ................... H04W 72/30
370/445
10,825,344 B2 * 11/2020 Belapurkar ........ G06Q 20/0855
(Continued)

FOREIGN PATENT DOCUMENTS

CN       109552330 A      4/2019
EP         3232381 A1    10/2017
(Continued)

OTHER PUBLICATIONS

Pattan Basavaraj, May 11, 2018, English Machine Translation_ WO 2019/216726 A1 provided by Patent Translate by EPO and Google (Year: 2018).*

(Continued)

*Primary Examiner* — Ashley L Redhead, Jr.
(74) *Attorney, Agent, or Firm* — Weaver Austin Villenueve & Sampson LLP

(57) ABSTRACT

Techniques described herein provide for leader selection of a group of vehicles, based on inter-vehicle communications. According to embodiments, a host vehicle can determine it qualifies to be the leader of a potential group by comparing vehicle information of other cars in the potential group with its own vehicle information. Once the determination has been made, the host vehicle can then send a request to be the group leader to the other vehicles. If the other vehicles accept, the host vehicle can initiate group formation. Otherwise, another vehicle can reject the request and send its own request to become the group leader, reinitiating group leader negotiation until a group leader is determined.

10 Claims, 13 Drawing Sheets

(58) Field of Classification Search
CPC ......... H04W 4/46; H04W 4/40; H04W 84/20; H04W 76/14; H04W 4/08
See application file for complete search history.

(56) References Cited

U.S. PATENT DOCUMENTS

| | | | | |
|---|---|---|---|---|
| 11,011,063 | B2* | 5/2021 | Brugman | G07C 5/08 |
| 11,568,743 | B2* | 1/2023 | Mezaael | B60N 2/0244 |
| 11,636,405 | B2* | 4/2023 | Atanasiu | G06Q 10/047 |
| | | | | 701/533 |
| 2010/0256852 | A1* | 10/2010 | Mudalige | G08G 1/22 |
| | | | | 701/24 |
| 2019/0096265 | A1* | 3/2019 | Mok | G08G 1/163 |
| 2019/0272760 | A1 | 9/2019 | McQuillen et al. | |
| 2019/0349719 | A1* | 11/2019 | Pattan | H04W 4/40 |
| 2019/0378418 | A1* | 12/2019 | Menadue | H04L 9/3247 |
| 2020/0021451 | A1* | 1/2020 | Pinheiro | H04W 4/40 |
| 2021/0218692 | A1* | 7/2021 | Higuchi | H04L 67/12 |
| 2021/0233406 | A1* | 7/2021 | Lu | G08G 1/161 |

FOREIGN PATENT DOCUMENTS

| | | | |
|---|---|---|---|
| JP | 2011250021 A | 12/2011 | |
| JP | 2013061788 A | 4/2013 | |
| JP | 2014056483 A | 3/2014 | |
| JP | 2014157489 A | 8/2014 | |
| JP | 2018077652 A | 5/2018 | |
| KR | 20150106260 A | 9/2015 | |
| KR | 20200038139 A | 4/2020 | |
| WO | 2018182603 A1 | 10/2018 | |
| WO | WO-2019216726 A1 * | 11/2019 | ............. H04L 67/26 |

OTHER PUBLICATIONS

Chen L., et al., "Cooperative Intersection Management: A Survey", IEEE Transactions on Intelligent Transportation Systems, IEEE, Piscataway, NJ, USA, vol. 17, No. 2, Feb. 1, 2016 (Feb. 1, 2016), pp. 570-586, XP011597405, ISSN: 1524-9050, DOI:10.1109/TITS. 2015.2471812, [retrieved on Jan. 29, 2016], p. 570-p. 579.

Fathollahnejad N., et al., "On Reliability Analysis of Leader Election Protocols for Virtual Traffic Lights", 2013 43rd Annual IEEE/IFIP Conference on Dependable Systems and Networks Workshop (DSN-W) , IEEE, Jun. 24, 2013, 12 Pages, XP032491755, ISSN: 2325-6648, DOI: 10.1109/DSNW.2013.6615529, Section III.

Supplementary European Search Report—EP20933279—Search Authority—The Hague—Nov. 7, 2023.

Apple: "Considerations on NR V2X Physical Layer Procedure", 3GPP TSG RAN WG1 #97, 3GPP Draft, R1-1907337 Considerations on NR V2X Physical Layer Procedures, 3rd Generation Partnership Project (3GPP), Mobile Competence Centre, 650, Route Des Lucioles, F-06921 Sophia-Antipolis Cedex, vol. RAN WG1, No. Reno, USA, May 13-May 17, 2019, pp. 1-6, May 13, 2019 (May 13, 2019), XP051728776, Retrieved from the Internet: URL: http://www.3gpp.org/ftp/Meetings%5F3GPP%5FSYNC/RAN1/Docs/R1%2D1907337%2Ezip [retrieved on May 13, 2019] the whole document, Chapter 3 Self-Contained Frame Structure within COT.

InterDigital Inc: "On Sidelink Synchronization for NR V2X", 3GPP TSG RAN WG1 Meeting #94bis, R1-1811214, Chengdu, China, Oct. 8-12, 2018, pp. 1-6.

International Search Report and Written Opinion—PCT/CN2020/088455—ISA/EPO—Jan. 27, 2021.

* cited by examiner

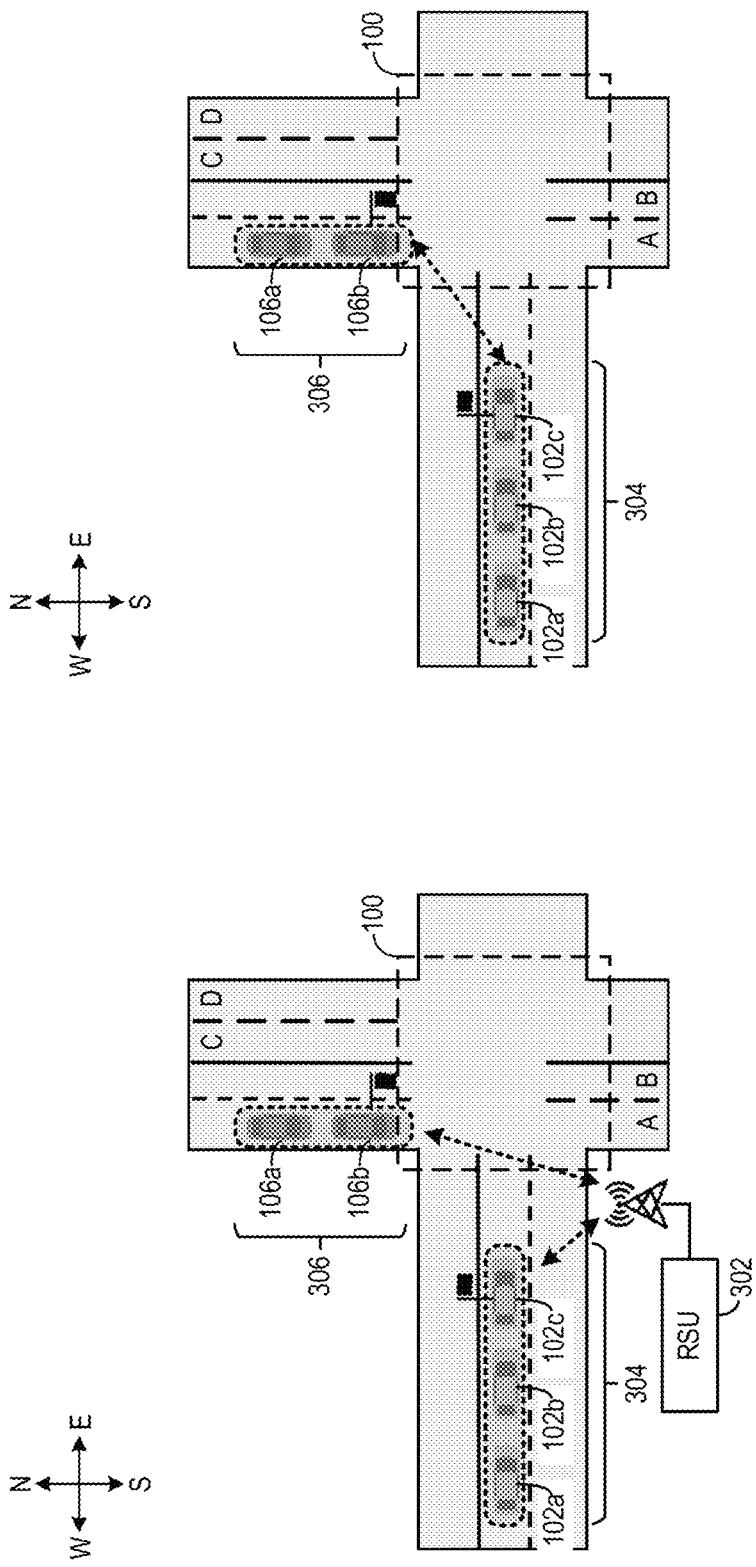

LEADER SELECTION IN V2X GROUP MANAGEMENT

BACKGROUND

Vehicle-to-everything (V2X) is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units, or RSUs), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as long-term evolution (LTE), fifth-generation new radio (5G NR), and/or other cellular technologies in a direct-communication mode as defined by the 3rd Generation Partnership Project (3GPP). A component or device on a vehicle, RSU, or other V2X entity that is used to communicate V2X messages is generically referred to as a V2X device or V2X user equipment (UE).

Autonomous and semi-autonomous vehicles, including vehicles with Advanced Driver-Assistance Systems (ADAS), can communicate and coordinate maneuvers using V2X. To help V2X-capable vehicles ("V2X vehicles") maneuver safely on the road, V2X vehicles can communicate intended maneuvers to other V2X vehicles. Groups of V2X vehicles may be formed to perform common maneuvers more efficiently.

BRIEF SUMMARY

Techniques described herein provide for leader selection of a group of vehicles, based on inter-vehicle communications. According to embodiments, a host vehicle can determine it qualifies to be the leader of a potential group by comparing vehicle information of other cars in the potential group with its own vehicle information. Once the determination has been made, the host can then a request to be the group leader to the other vehicles. If the other vehicles accept, the host vehicle can initiate group formation. Otherwise, another vehicle can reject the request and send its own request to become the group leader, reinitiating group leader negotiation until a group leader is determined.

BRIEF DESCRIPTION OF THE DRAWINGS

FIGS. 3A-3D illustrate example scenarios in which V2X vehicles can be managed to perform maneuvers in groups.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

As referred to herein, "V2X devices," "V2X vehicles," and "V2X entities" respectively refer to devices, vehicles, and entities capable of transmitting and receiving V2X messages. Similarly, "non-V2X vehicles" and "non-V2X entities" refer to vehicles and entities that do not or cannot engage in V2X communications. Further, a "V2X device," which is described in more detail herein, refers to a device, system, component, or the like which may be incorporated into and/or used by a V2X entity to enable V2X communications. Although many embodiments describe "V2X vehicles" and "non-V2X vehicles," it will be understood that many embodiments can be expanded to include non-vehicle entities, such as pedestrians, cyclists, road hazards, obstructions, and/or other traffic-related objects. Further, it can be noted that embodiments may apply to vehicles and/or RSUs capable of traffic-related communication, and not necessarily to V2X-capable vehicles/RSUs. Moreover, although the embodiments provided herein can be executed by autonomous and/or semi-autonomous vehicles, embodiments are not so limited. Embodiments may, for example, include traditional (non-autonomous) vehicles having capabilities for determining and communicating intended maneuvers (e.g., within on-board navigation computer, capable of communicating instructions to a human driver). A person of ordinary skill in the art will appreciate such variations.

Embodiments for group leader selection provided herein allow a group of V2X vehicles to determine, among themselves, a leader for the group. This group leader selection process involves protocol that allows each vehicle to gather information from other vehicles and determine whether it qualifies to be the group leader. Group leader selection, and group formation more generally, allow for more efficient communications and maneuver execution among V2X vehicles.

Figure 1B:
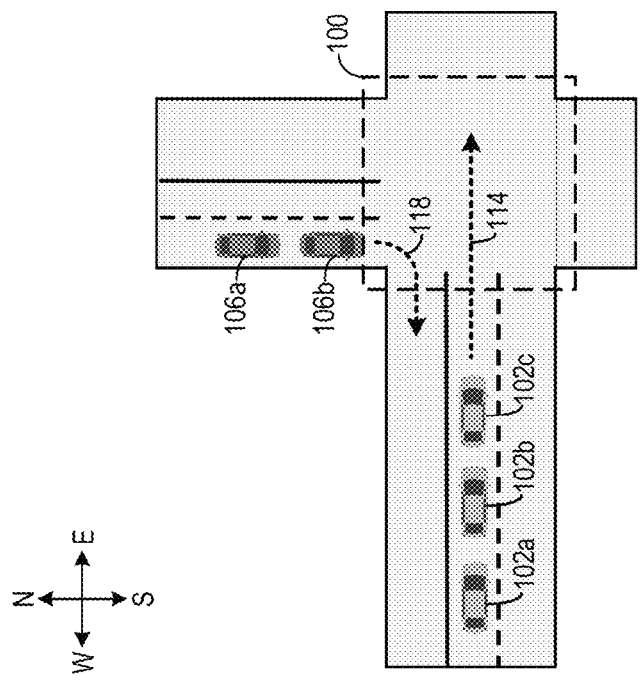
FIGS. 1A and 1B illustrate example scenarios in which V2X vehicles may perform similar maneuvers.
Figure 1A:
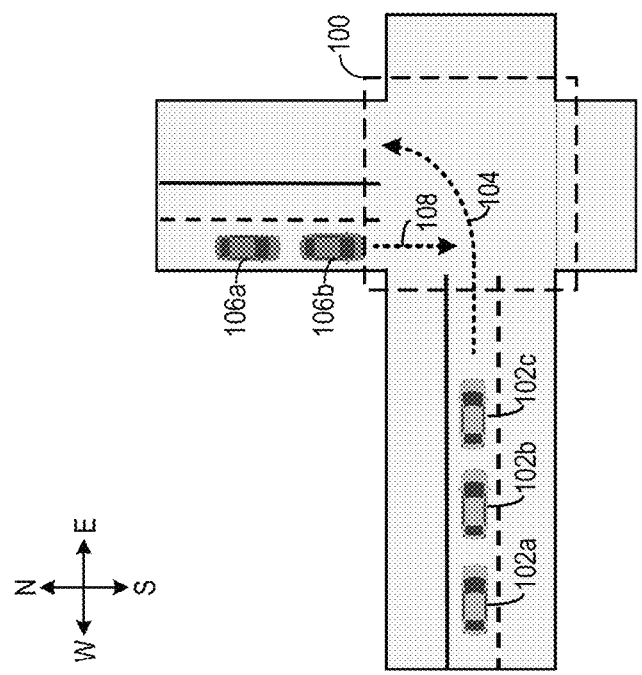

FIGS. 1A and 1B illustrate example scenarios in which a group of V2X vehicles may be formed to maneuver through a traffic intersection 100. In FIG. 1A, vehicles 102a, 102b, and 102c approach traffic intersection 100 from the west (represented by "W" in FIG. 1A) and intend to turn north (represented by "N" in FIG. 1A) through the traffic intersection along a trajectory 104, whereas vehicles 106a and 106b approach traffic intersection 100 from the north and intend to travel south (represented by "S" in FIG. 1A) through traffic intersection 100 along a trajectory 108. In FIG. 1A, as trajectory 104 of vehicles 102a-c and trajectory 108 of vehicles 106a-b intersect, the maneuvers of vehicles 102a-c and 106a-b can be coordinated to avoid collision at traffic intersection 100 and based on other policies. For example, to reduce the total amount of time spent by vehicles 102a-c and 106a-b in waiting and traversing through traffic intersection 100, vehicles 102a-c can be controlled to stop or to slow down as they approach traffic intersection 100 from the west, while vehicles 106a-b can be controlled to move through traffic intersection 100 along trajectory 108, as it may take longer for vehicles 102a-c to move through traffic intersection 100 than vehicles 106a-b. After vehicles 106a-b have moved through traffic intersection 100, vehicles 102a-c can be controlled to move through traffic intersection 100 along trajectory 104. In some examples, vehicles 102a-c can also be controlled to move through traffic intersection 100 before vehicles 106a-b, based on, for example, vehicles 102a-c having a higher priority (e.g., being emergency vehicles) than vehicles 106a-b.

Figure 2B:
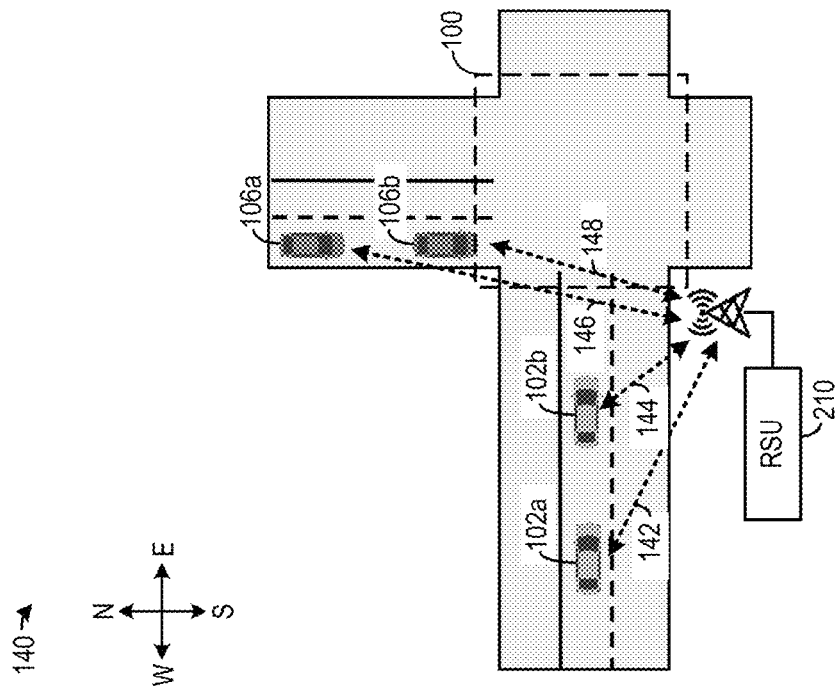
FIGS. 2A and 2B illustrate example scenarios in which maneuvers for V2X vehicles are managed using messaging between vehicles only, or between vehicles and an RSU.
Figure 2A:
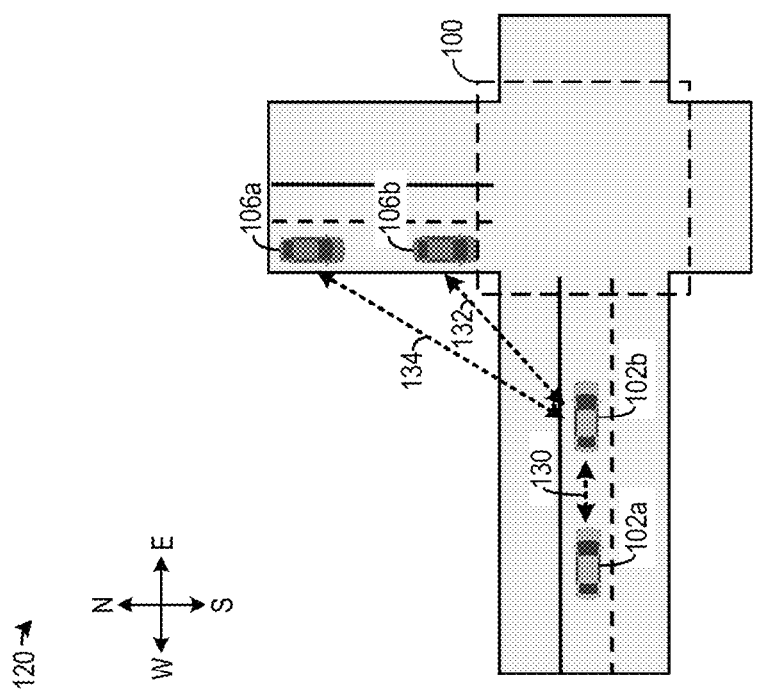

FIG. 1B illustrates another example scenario of management of traffic intersection 100. As shown in FIG. 1B, vehicles 102a-c approach traffic intersection 100 from the west and intend to move to the east along trajectory 114, whereas vehicles 106a-b approach traffic intersection 100 from the north and intend to turn west at traffic intersection 100 along trajectory 118. As trajectory 114 does not intersect with trajectory 118, vehicles 102a-c need not slow down to let vehicles 106a-b move through traffic intersection 100, and vice versa. Therefore, vehicles 102a-c and 106a-b can be controlled to move through traffic intersection 100 without stopping to minimize the total transit time of vehicles 102a-c and 106a-b in traversing through traffic intersection 100. As can be seen, vehicles 102a-c and vehicles 106a-b maneuver in a common fashion and therefore can be managed as a single group. FIGS. 2A and 2B further illustrate how, without groups, vehicle maneuver management can be inefficient.

Traffic messaging technologies such as V2X could be particularly useful for managing traffic maneuvers through an intersection 100 and elsewhere, with respect to both autonomous and non-autonomous vehicles. FIGS. 2A and 2B illustrate example arrangements of managing the maneuver of vehicles through traffic intersection 100. FIG. 2A illustrates a distributed mechanism 120, in which each vehicle approaching traffic intersection 100, such as vehicle 102a, 102b, 106a, and 106b can communicate with each other to perform inter-vehicle negotiation, and each vehicle can schedule its own maneuver through traffic intersection 100 based on the result of the inter-vehicle negotiation. For example, in FIG. 2A, vehicle 102b can establish communication links 130, 132, and 134 with, respectively, vehicles 102a, 106b, and 106a. Communication links 130, 132, and 134 can be based on the V2X standard. Vehicle 102b can exchange information about the intended trajectories (e.g., trajectories 104 and 108 of FIG. 1A) with other vehicles and negotiate the scheduled maneuvers (e.g., speed, trajectory) through traffic intersection 100 based on the exchanged information via V2X messaging, messaging as defined by standards organizations, such as the Society of Automotive Engineers (SAE) or European Telecommunications Standards Institute Intelligent Transport Systems (ETSI), over the communication links.

Although distributed mechanism 120 in FIG. 2A can improve efficiency by distributing the scheduling operation across the vehicles, such arrangements also have a few limitations. Specifically, distributed mechanism 120 may require a large number of messages be exchanged between the vehicles, which can cause heavy load to the communication and computation systems at the vehicles. For example, as described above, vehicles need to communicate with other vehicles approaching traffic intersection 100 to negotiate their maneuvers through traffic intersection 100. Message exchanges may be required in every step of the negotiation, which can lead to a large number of messages being exchanged and create heavy load to the communication and computation systems at the vehicles.

Moreover, trajectory deadlock can be a potential problem in distributed mechanism 120 if a large number of vehicles is involved. For example, the vehicles may have different intended trajectories, priorities, etc., which may take a long time to determine a maneuver arrangement through traffic intersection 100 that resolves the conflicting requirements of the involved vehicles. As the vehicles may need to wait or even stop before the maneuver arrangement is determined, distributed mechanism 120 can add delay to the maneuver of the vehicles and slow the traffic. The problem of trajectory deadlock can be further exacerbated when, for example, the properties of a vehicle (e.g., priority, intended trajectory, speed, direction of movement) change during the determination of the maneuver arrangement, which can lead to a chain effect of trajectory adjustment of the rest of vehicles and can lead to trajectory deadlock if no adjustment can accommodate the changed properties of the vehicle.

FIG. 2B illustrates a centralized mechanism 140 of managing the maneuver of vehicles through traffic intersection 100. As shown in FIG. 2B, a management system that is part of an infrastructure component managing the intersection, such as an RSU 210, can establish communication links 142, 144, 146, and 148 with, respectively, vehicles 102a, 102b, 106a, and 106b. Communication links 142, 144, 146, and 148 can be based on the V2X standard. RSU 210 can receive information of the intended trajectories of these vehicles via the communication links and control the individual maneuver of each vehicle based on the intended trajectories, to avoid collision and to speed up the movement of the vehicles through traffic intersection 100. RSU 210 can directly control the individual maneuver of each vehicle through traffic intersection 100 via messaging (e.g., V2X, SAE, ETSI) over the communication links.

Although centralized mechanism 140 in FIG. 2B can reduce the likelihood of trajectory deadlock by having a single management system to dictate the maneuver of the vehicles, centralized mechanism 140 can introduce substantial computation burden on the RSU, especially in a case where the RSU controls the movements of a large number of vehicles through traffic intersection 100. Moreover, centralized mechanism 140 can lead to inefficiency when, for example, the RSU individually communicates with and controls vehicles having the same intended trajectory through traffic intersection 100.

FIGS. 3A-3D illustrate how maneuver management may be conducted using groups of vehicles performing similar maneuvers, according to embodiments. It can be noted that, although the illustrations show vehicles maneuvering through intersection 100, embodiments are not so limited. Embodiments of leader selection provided herein may be applicable to any type of maneuvering in which groups may be formed. This can include maneuvering through different types of intersections, merging onto and/or exiting from roads, making lane changes, and so forth. Additionally, embodiments may not only apply to temporary groups (formed to perform a single maneuver or set of maneuvers), but also longer-term groups (e.g., "platoons") that may not otherwise be formed using third-party applications.

As shown in FIG. 3A, a management system that is part of an infrastructure component managing traffic intersection 100, such as an RSU 302, can manage vehicle groups. The RSU 302 may optionally form a new vehicle group based on different criteria. For example, RSU 302 may form a new vehicle group periodically, when a number of unattached vehicles (e.g., vehicles that are not assigned to any vehicle group) within a predetermined distance from traffic intersection 100 and approaching traffic intersection 100 exceeds a threshold, etc. As to be described below, RSU 302 may also form a new vehicle group when a vehicle declines to be grouped into a particular vehicle group, and RSU 302 can form a new vehicle group for that vehicle. Groups may be formed from vehicles performing similar maneuvers. Here, if vehicles 102a-c are maneuvering through the intersection 100 in a similar manner, they may be put into a first group 304. Similarly, if vehicles 106a-b are also maneuvering through the intersection 100 in a similar manner (with each other, yet differently from the vehicles in the first group 304), then they may be grouped into a second group 306.

After the vehicles are grouped into vehicle groups, RSU 302 can control the movements of the vehicles via a two-tier control mechanism. Specifically, as a first tier of the control mechanism, RSU 302 can determine group maneuver targets of the vehicle groups through traffic intersection 100 by transmitting a message indicating a group maneuver of each vehicle group to the group leader of each vehicle group. The group maneuver target of a vehicle group can schedule a movement of the vehicle group as a whole. As a second tier of the control mechanism, the group leader of each vehicle group can instruct other vehicles in the group regarding timing and trajectory for each vehicle to perform the maneuver. The group leader can also report a current state of motion (e.g., speed, direction, position) of the vehicle group as a whole back to RSU 302, which allows RSU 302 to further track and manage group. The communication of messages indicating the vehicle groups, the group maneuver of each vehicle group, and the maneuver target of each member vehicle within each vehicle group can be based on messaging (e.g., V2X, SAE, ETSI).

FIG. 3B illustrates an alternative embodiment to the embodiment shown in FIG. 3A. Here, management of the group is performed by group leaders (vehicles 102c and 106b) without a separate infrastructure component managing traffic intersection 100. In such embodiments, the vehicles themselves can provide group formation, including determination of a leader of the group. The group leaders can then communicate for the group to other entities (e.g., other groups, RSUs). (That said, as noted, the RSU 302 in FIG. 3A may not form groups. That is, the vehicles themselves may form groups and designate group leaders, without the help of the RSU 302. In such instances, the RSU 302 can then manage maneuvering of the already-formed groups through the intersection 100.) To maneuver through the intersection 100, each group can communicate with the other group (via group leaders) to coordinate the maneuvers. Again, the communication of messages indicating the vehicle groups, the group maneuver of each vehicle group, and the maneuver target of each member vehicle within each vehicle group can be based on messaging (e.g., V2X, SAE, ETSI).

Figure 3D:
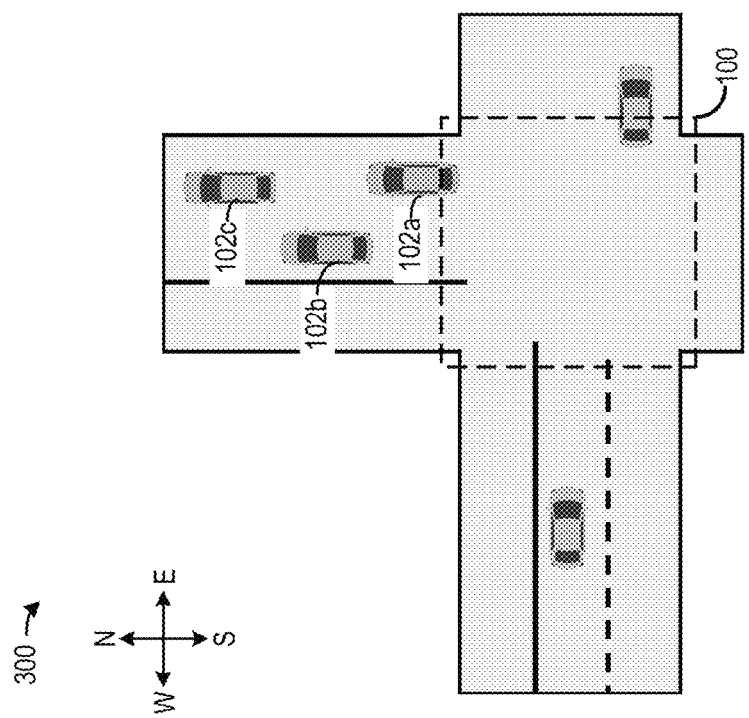
Figure 3C:
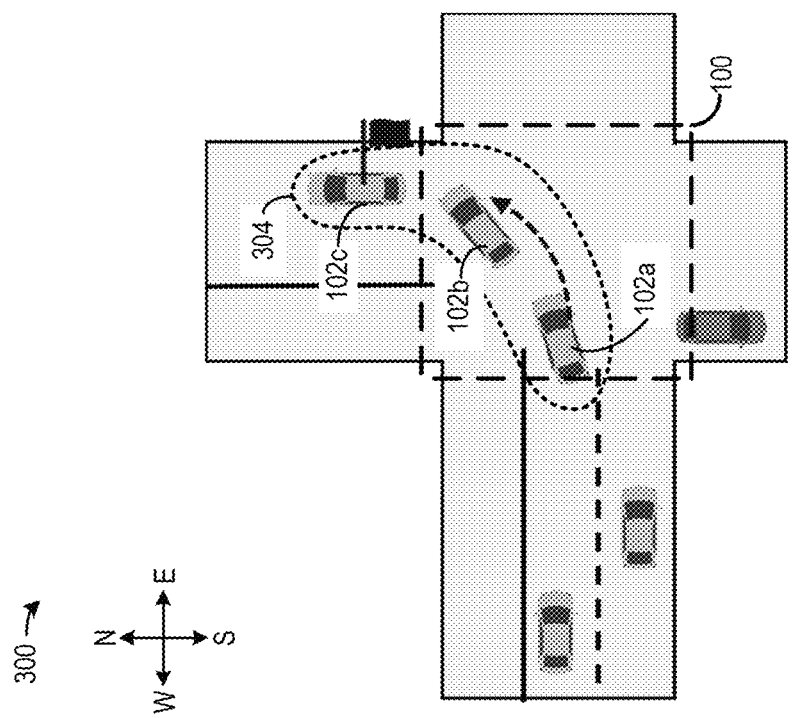

A vehicle group can be terminated (or "dismissed") when all member vehicles of the vehicle group have completed the maneuver. FIGS. 3C and 3D illustrate example operations of vehicle group 304 as the vehicle group exits traffic intersection 100.

As shown in FIG. 3C, group leader 102c can still set the vehicle maneuver of all member vehicles within vehicle group 304 as the vehicle group traverses through traffic intersection 100, even after group leader 102c exits traffic intersection 100. In FIG. 3D, after the last member vehicle within vehicle group 304 (vehicle 102a) exits traffic intersection 100, vehicle group 304 can be terminated, and group leader 102c no longer controls the vehicle maneuver of vehicles 102a and 102b.

Embodiments herein are directed to selection of a group leader for a group of vehicles, based on inter-vehicle communications. According to embodiments, a host vehicle can determine it qualifies to be the leader of a potential group by comparing vehicle information of other cars in the potential group with its own vehicle information. Once the determination has been made, the host can then request to be the group leader to the other vehicles. If the other vehicles accept, the host vehicle can initiate group formation. Otherwise, another vehicle can reject the request and send its own request to become the group leader, reinitiating group leader negotiation until the group leader is determined. Processes of leader selection, according to some embodiments, are illustrated in FIGS. 4A and 4B.

Figure 4A:
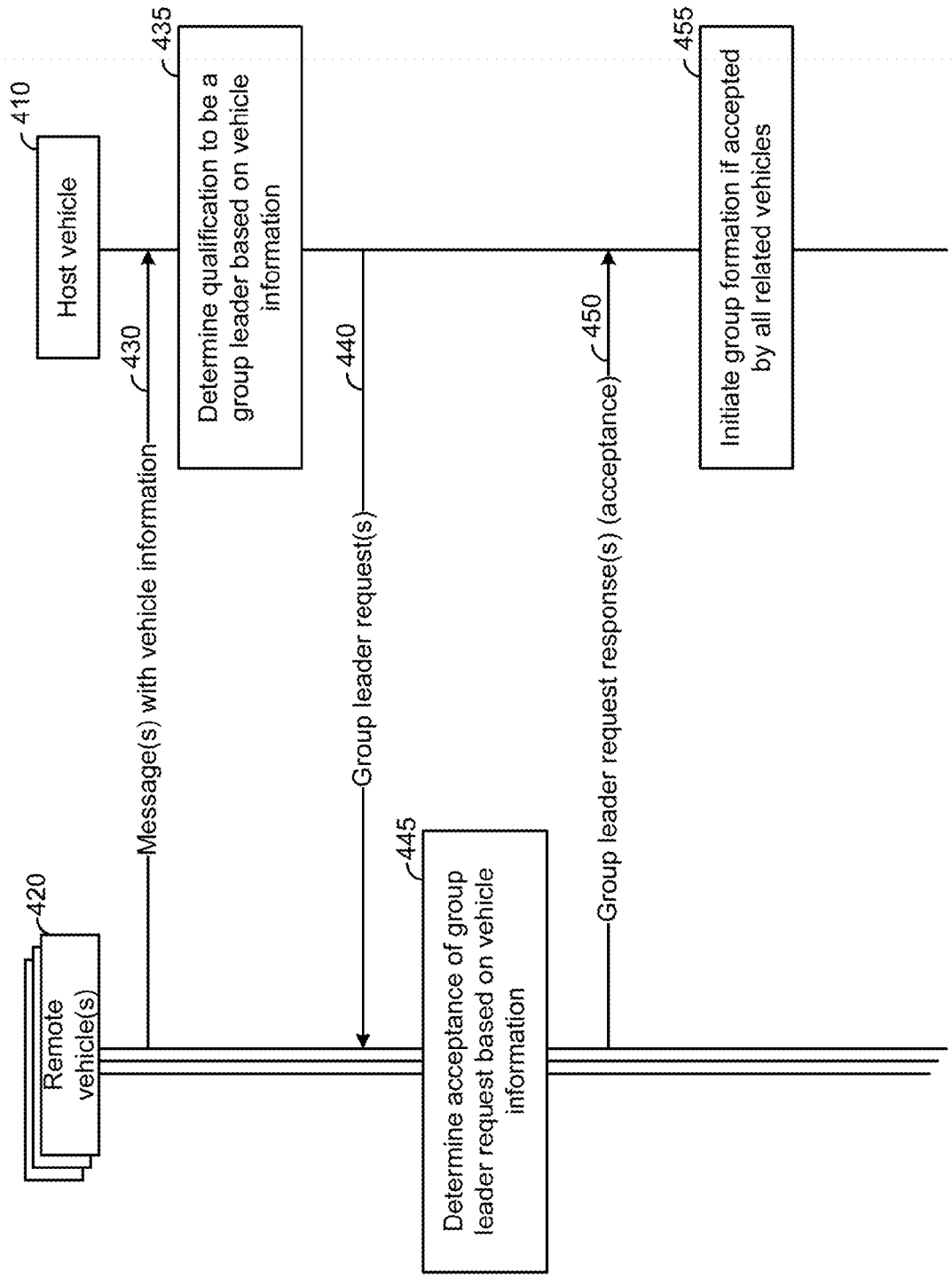
FIGS. 4A and 4B are call flow diagrams illustrating the basic functions and communication between a host vehicle and one or more remote vehicles when determining a leader for a potential group, according to some embodiments.
Figure 4B:
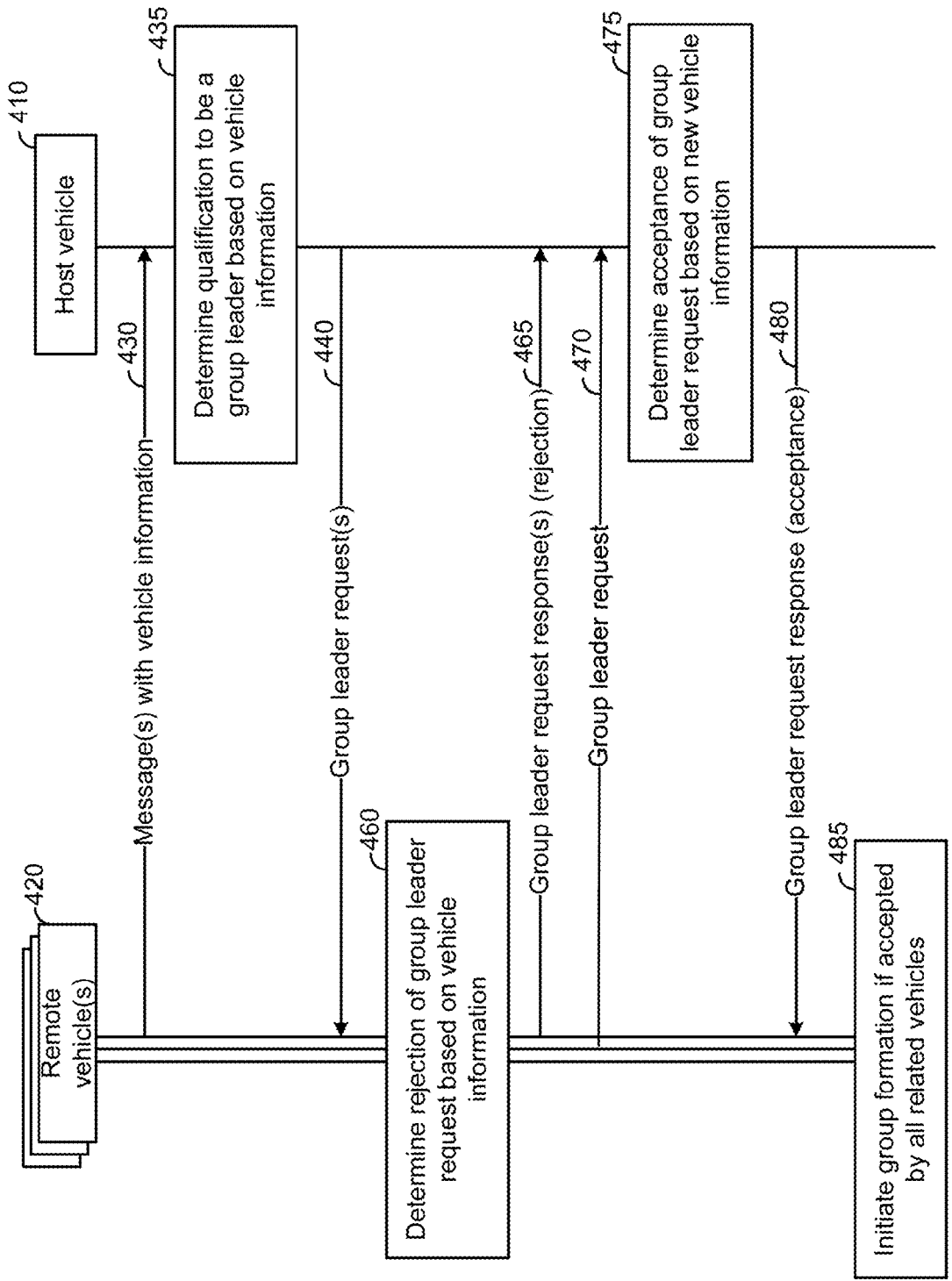
Figure 8:
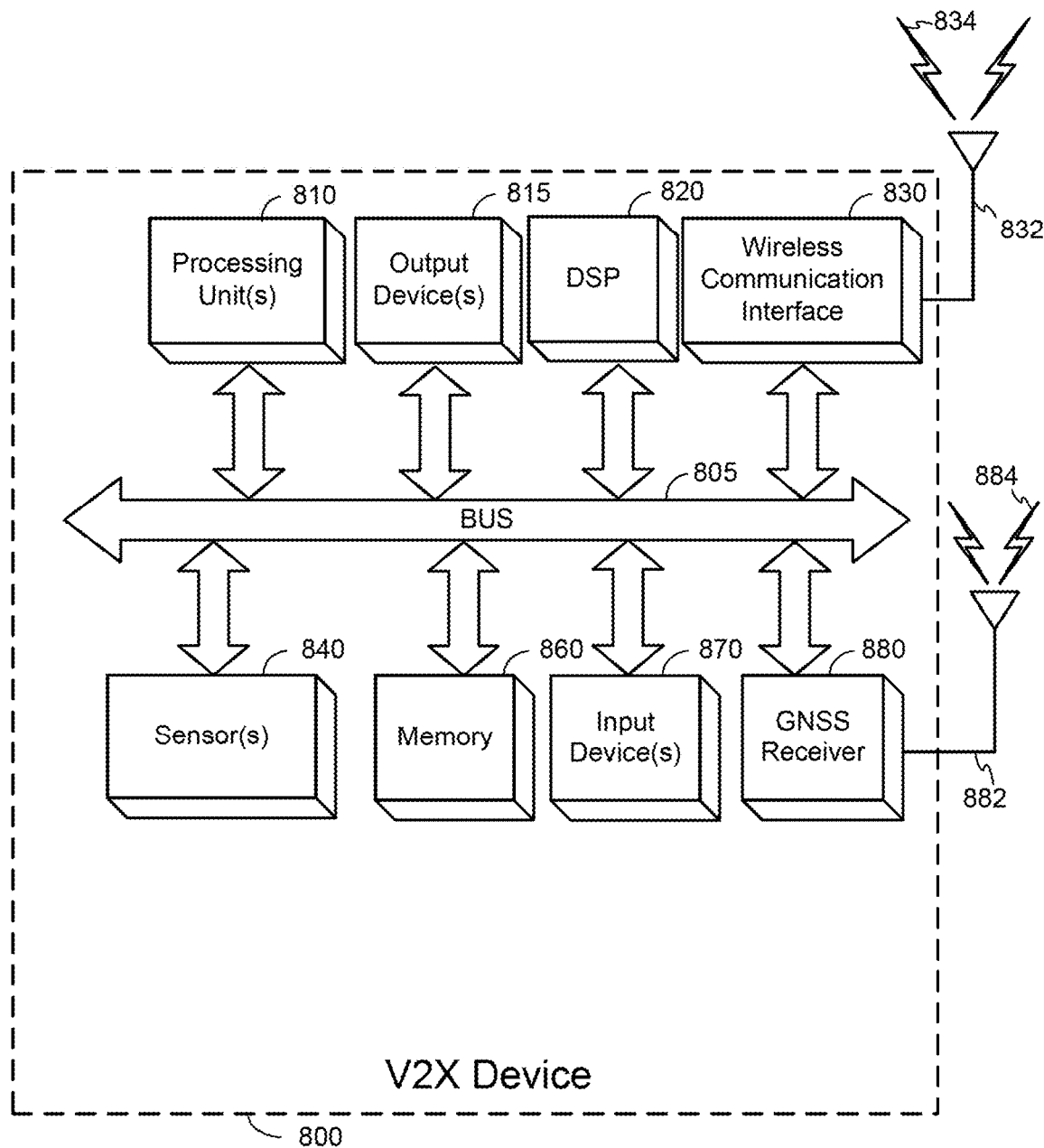
FIG. 8 is block diagram of an embodiment of a V2X device.

FIG. 4A is a call flow diagram illustrating the basic functions and communication between a host vehicle 410 and one or more remote vehicles 420 when determining a leader for a potential group, according to an embodiment. As used herein, the term "host vehicle" refers to the vehicle sending and receiving RF communications with other traffic entities (other vehicles, RSUs, etc.). This terminology is based on perspective and can therefore change based on the vehicle being discussed. For example, with reference to FIG. 1A, where the capabilities of a specific vehicle 102c are being discussed, the specific vehicle 102c may be referred to as the host vehicle, while other vehicles (e.g., 102a, 102b, 106a, and 106b) may be referred to as "remote vehicles" or "other vehicles." However, the designation of "host vehicle" and "remote vehicle" can change if discussing the functionality of another specific vehicle (e.g., 102b). The functions of the blocks illustrated in FIG. 4A attributed to a host vehicle 410 or remote vehicle(s) 420 may be performed by a V2X device of the respective host vehicle or remote vehicle(s) 420. Software and/or hardware components of a V2X device are illustrated in FIG. 8 and discussed herein below.

Initially, the host vehicle may receive one or more messages with vehicle information (shown by arrow 430) from the remote vehicle(s) 420. Here, messages may comprise information regularly shared between V2X vehicles. This can include, for example, a Basic Safety Message (BSM), Cooperative Awareness Messages (CAM), or similar messages, which may be broadcast by remote vehicle(s) 420. Additionally or alternatively, the host vehicle 410 may receive direct communication from remote vehicle(s) 420 comprising messages with vehicle information. In a similar manner, the host vehicle 410 may send similar messages (not shown) to the remote vehicle(s) 420.

Using this vehicle information, the host vehicle can, as shown at block 435, determine whether the host vehicle is qualified to be a group leader based on vehicle information.

The vehicle information itself may include heading, location, and intended maneuver for each of the remote vehicles 420. The host vehicle 410 can then determine whether a group should be formed based on one or more of the remote vehicles 420 having a intended maneuver in common with the host vehicle 410. If so, the host vehicle 410 can further determine whether it is qualified to be the group leader for the potential group.

The determination of whether the host vehicle 410 qualifies as a group leader can depend on one or more rules, which may be jointly followed by both the host vehicle 410 and remote vehicle(s) 420. One such qualification to become group leader may include how close the host vehicle 410 is to a starting point of the maneuver. That is, if the host vehicle 410 is the closest of the vehicles intending to make a common maneuver to the starting point of the intended maneuver, the host vehicle 410 may be qualified to be the group leader. Additional qualifications can include, for example, sensor capabilities (e.g., what sensors the host vehicle 410 has at its disposal for group management), communication capabilities (e.g., the type of communication(s) the host vehicle is capable of), and computation capabilities (a vehicle having greater processing capacity, for example, may be better suited to be a group leader). The lack of certain qualifications (e.g., sensor capabilities, communication capabilities) then disqualifies the host vehicle 410 from being group leader. Because the host vehicle 410 and remote vehicle(s) 420 are sharing vehicle information with each other (including the information needed to determine which vehicle should be group leader), and because the host vehicle 410 and remote vehicle(s) 420 are (presumably) using the same set of rules to determine which vehicle is most qualified to be the group leader, each vehicle (including the host vehicle 410) can determine whether it is uniquely qualified to be the group leader.

If the host vehicle 410 determines that it is qualified to be the group leader, it can then send a group leader request to each of the remote vehicles 420, as shown by arrow 440. The group leader request may be sent to each remote vehicle 420 with an intended maneuver in common with the host vehicle 410, and which would therefore be part of the group, if formed. The group leader request may comprise a message soliciting a response from a remote vehicle 420, either accepting or rejecting the request.

Upon receiving the group leader request, each remote vehicle 420 determines acceptance of the group leader request based on vehicle information, as indicated at block 445. Again, because remote vehicle(s) 420 and host vehicle 410 utilize the same rules for group leader determination, each remote vehicle 420 will accept the group leader request if it has the same information as the host vehicle 410 and send an acceptance to the group leader request response, as shown by arrow 450. (FIG. 4B, described in more detail below, illustrates what happens in the case where a group leader request is rejected.)

Upon receiving an acceptance from each remote vehicle 420, the host vehicle 410 can then initiate formation, as shown at block 455. Additional details regarding group formation are provided in FIG. 5, which is described in more detail below.

FIG. 4B is another call flow diagram illustrating a variation to the basic functions and communication shown in FIG. 4A, in the case where a remote vehicle 420 rejects the group leader request, according to an embodiment. Here, the message(s) with vehicle information (arrow 430) determines qualification to be group leader based on vehicle information (block 435), and group leader request(s) (arrow 440) echoes corresponding functions shown in FIG. 4A. Here, however, there may be a disparity between the information at the host vehicle 410 and remote vehicle(s) 420. A remote vehicle may therefore determine that it qualifies to be group leader, rather than the host vehicle 410. (This could be based on a determination that it is closer to the beginning of the maneuver than the host vehicle 410, in which case the host vehicle 410 may not have an accurate location of the remote vehicle.) If this is the case, the remote vehicle 420 determines to reject the group leader request received from the host vehicle 410, based on vehicle information, as shown at block 460.

In response to the determination made at block 460, the remote vehicle then sends a rejection of the group leader request (arrow 465), followed by a group leader request (470). The remote vehicle 420 making the rejection can provide the host vehicle 410 with information used to make the rejection, in either the rejection (arrow 465), the group leader request (arrow 470), or a separate message (not shown). In the example where the host vehicle 410 does not have accurate location information of the remote vehicle 420 (resulting in the host vehicle's determination that it qualifies to be group leader), the remote vehicle 420 may provide the host vehicle 410 with accurate location information.

Having received the group leader request (arrow 470) and new information from the rejecting remote vehicle, the host vehicle 410 can then determine whether to accept the request (block 475). Again, because the host vehicle 410 and remote vehicle 420 are using the same set of rules to determine a group leader, the host vehicle 410 will determine to accept the request from the remote vehicle 420, if based on the same set of information. If the host vehicle 410 determines to accept, it will send a response to the group leader request indicating the acceptance (arrow 480), and the remote vehicle can initiate group formation (block 485). (If the host vehicle 410 determines to reject, based on new information, it can send the new information to the remote vehicle 420 in a manner similar to which the remote vehicle 420 sent new information to the host vehicle 410, and conflict resolution can continue in a similar manner.) It can be noted that, in addition to the group leader request 470 sent from the remote vehicle 420 to the host vehicle 410, the remote vehicle 420 that determined it qualifies to be the group leader can send additional group leader requests (not shown) to other vehicles within the potential group.

In V2X communications, information sharing may occur very frequently. V2X vehicles can broadcast BSM messages, for example, many times per second (e.g., every 100 ms). Processes in FIGS. 4A and 4B may occur on a similar timescale and may therefore result in leader determination (including any conflict resolution) in real time, as vehicles are approaching a maneuver. The process of group formation illustrated in FIG. 5 can also be performed in real time, creating a group of vehicles prior to the execution of the maneuver and therefore allowing for the previously described efficiencies in group-level maneuvering.

Figure 5:
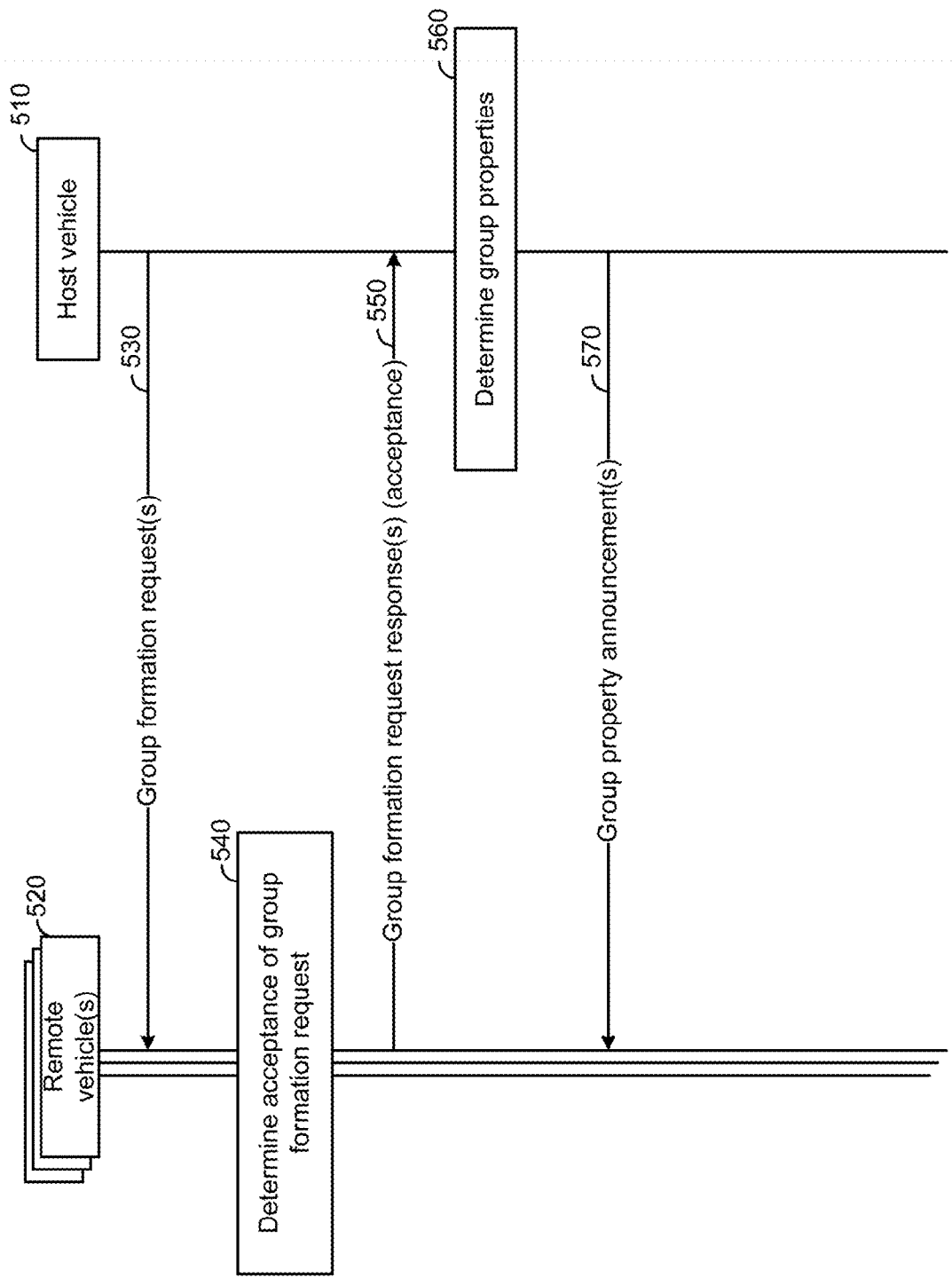
FIG. 5 is a call flow diagram illustrating a process in which a host vehicle, once designated as group leader, can form a group of vehicles, according to some embodiments.

FIG. 5 is a call flow diagram illustrating a process in which a host vehicle 510, once designated as group leader (e.g., using a process like that of FIG. 4A or 4B), can form a group of vehicles, according to an embodiment. Again, the functions of the blocks illustrated in FIG. 5 attributed to a host vehicle 510 or remote vehicle(s) 520 may be performed by a V2X device of the respective host vehicle 510 or remote vehicle(s) 520. Software and/or hardware components of a V2X device are illustrated in FIG. 8 and discussed herein below.

The process can begin with the host vehicle 510 sending a group formation request to each remote vehicle 520 of the potential group (as shown at arrow 530). Each remote vehicle 520 then determines whether it will accept the group formation request, as indicated at block 540. Because remote vehicle(s) 520 likely recently accepted a group leader request from the host vehicle 510, the remote vehicle(s) 520 also is/are likely in condition to accept the group formation request (arrow 530). That said, a recent change in an intended maneuver or other factor impacting a remote vehicle's ability to join the group could cause the remote vehicle 520 to reject the request. The host vehicle 510 can create a group from remote vehicle(s) 520 from which the host vehicle 510 receives an acceptance of the group formation request (as shown at arrow 550), and exclude any remote vehicle(s) 520 from which an acceptance is not received.

The host vehicle 510 can then determine properties for the group, as shown at block 560. This may include, for example, a group ID, intended maneuver, and/or other properties specific to the group. The host vehicle 510 can then send a group property announcement (shown at arrow 570), indicative of these group properties, to each remote vehicle 520 in the newly formed group.

Figure 6:
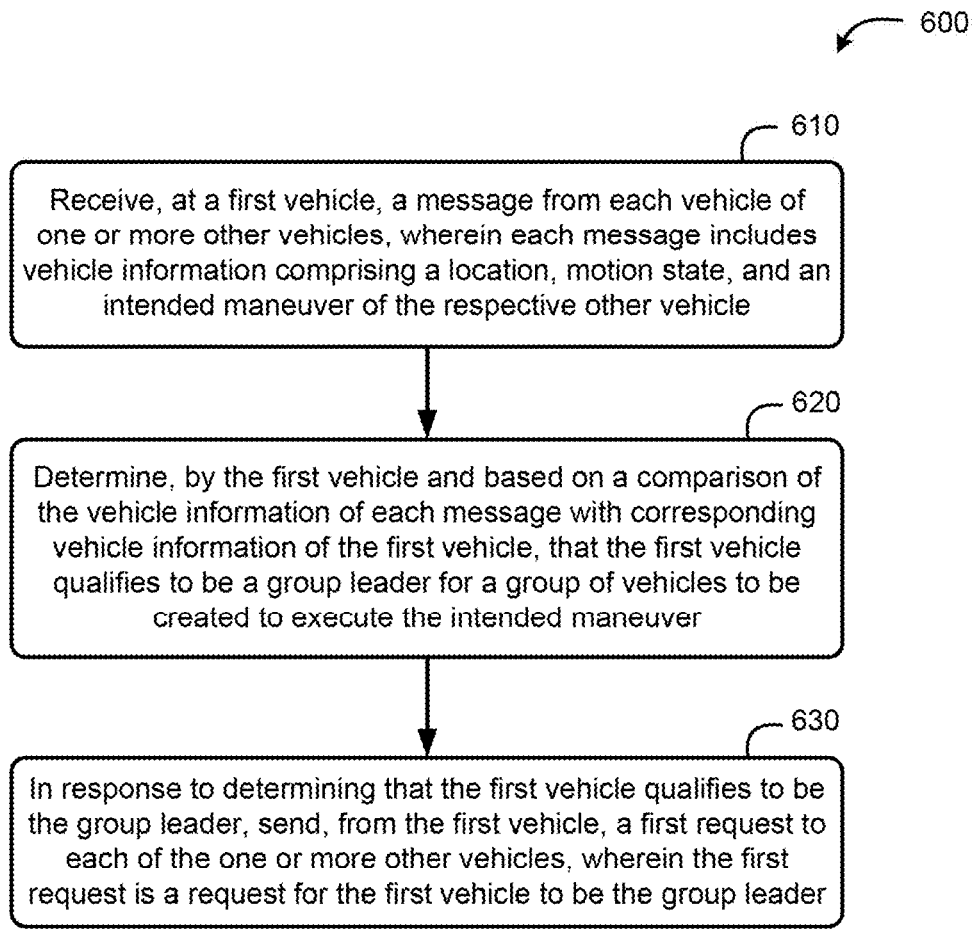
FIGS. 6 and 7 are flow diagrams of methods of leader selection in vehicle group formation, according to some embodiments.

FIG. 6 is a flow diagram of a method 600 of leader selection in vehicle group formation, according to an embodiment. The functions illustrated in the blocks of FIG. 6 may be performed by a first vehicle when determining whether to be group leader. As such, the functions in one or more of the blocks illustrated in FIG. 6 may be one way to implement the functionality illustrated in FIG. 4A or 4B, from the perspective of the first vehicle (e.g., a host vehicle).

At block 610, the functionality comprises receiving, at a first vehicle, a message from each vehicle of one or more other vehicles, wherein each message includes vehicle information comprising a location, motion state, and an intended maneuver of the respective other vehicle. (Here, the one or more other vehicles may correspond to the remote vehicle(s) 420 of FIGS. 4A and 4B.) As noted in the embodiments described previously, these messages may comprise BSM, CAM, and/or other messages routinely sent between vehicles in a V2X environment. For embodiments that do not take place in V2X environments, similar messages may be used. Alternatively, according to some embodiments, messages may be sent between vehicles for the purpose of leader selection and group formation.

Means for performing the functionality shown at block 610 may comprise software and/or hardware components of a V2X device, such as a bus 805, processing unit(s) 810, digital signal processing (DSP) 820, wireless communication interface 830, memory 860, and/or other components of the V2X device 800 illustrated in FIG. 8 and described in more detail below.

At block 620, the functionality comprises determining, by the first vehicle and based on a comparison of the vehicle information of each message with corresponding vehicle information of the first vehicle, that the first vehicle qualifies to be a group leader for a group of vehicles to be created to execute the intended maneuver. As noted, qualifications can vary, depending on desired functionality. In many instances, a location of the first vehicle may be one such qualification. As such, in some embodiments of the method 600, determining that the first vehicle qualifies to be the group leader of the group of vehicles may comprise determining that the first vehicle is closer to a beginning location of the intended maneuver than any vehicle of the one or more other vehicles. Additionally or alternatively, other qualifications may be considered, for example, in some embodiments of the method 600, determining that the first vehicle qualifies to be the group leader for the group of vehicles may comprise determining that the first vehicle has more maneuver-related capabilities than any vehicle of the one or more other vehicles. Such maneuver-related capabilities may comprise sensor capabilities, communication capabilities, or computation capabilities, or any combination thereof.

Means for performing the functionality shown at block 620 may comprise software and/or hardware components of a V2X device, such as a bus 805, processing unit(s) 810, DSP 820, memory 860, and/or other components of the V2X device 800 illustrated in FIG. 8 and described in more detail below.

At block 630, the functionality comprises, in response to determining that the first vehicle qualifies to be the group leader, sending, from the first vehicle, a first request to each of the one or more other vehicles. The first request is a request for the first vehicle to be the group leader. As noted, this can result in different situations, depending on whether the requests are accepted by the one or more other vehicles. For example, the method 600 may further comprise receiving, at the first vehicle, and acceptance of the first request from each of the one or more other devices, and, in response to receiving the acceptance of the first request, initiating group formation by the first vehicle.

For instances in which the first vehicle initiates group formation, embodiments of the method 600 may further include functionality for forming the group. Such functionality can comprise sending, from the first vehicle, a second request to each of the one or more other vehicles, where the second request is a request to form the group of vehicles. The functionality can further comprise receiving, at the first vehicle, and acceptance of the second request from each of the one or more vehicles, and, in response to receiving the acceptance of the second request, (1) determining, by the first vehicle, one or more group properties for the group of vehicles, and (2) sending, from the first vehicle, a group property announcement to each of the one or more other vehicles. The group property announcement can comprise information indicative of the one or more group properties for the group of vehicles. Again, these properties may comprise a group ID, intended maneuver, and/or other group-specific information.

For cases in which a rejection is received by the first vehicle, the method 600 may include functions, in the manner described above, to resolve this conflict and determine a group leader. Embodiments of the method 600 may therefore further comprise receiving, at the first vehicle, a rejection of the first request from a second vehicle of the one or more vehicles, and further receiving, at the first vehicle, additional vehicle information regarding the second vehicle. (As noted, this additional vehicle information may be included in the rejection of the first request from the second vehicle. Alternatively, this additional information may be sent in a separate message.) The method 600 may further comprise receiving, at the first vehicle, a third request from the second vehicle, where the third request is a request for the second vehicle to be the group leader, and determining, at the first vehicle and based on the additional vehicle information regarding the second vehicle, to accept the request (e.g., in the manner illustrated in FIG. 4B). The method 600 may then comprise sending, from the first vehicle to the second vehicle, an acceptance of the third request.

Means for performing the functionality shown at block 630 may comprise software and/or hardware components of a V2X device, such as a bus 805, processing unit(s) 810, DSP 820, wireless communication interface 830, memory 860, and/or other components of the V2X device 800 illustrated in FIG. 8 and described in more detail below.

Figure 7:
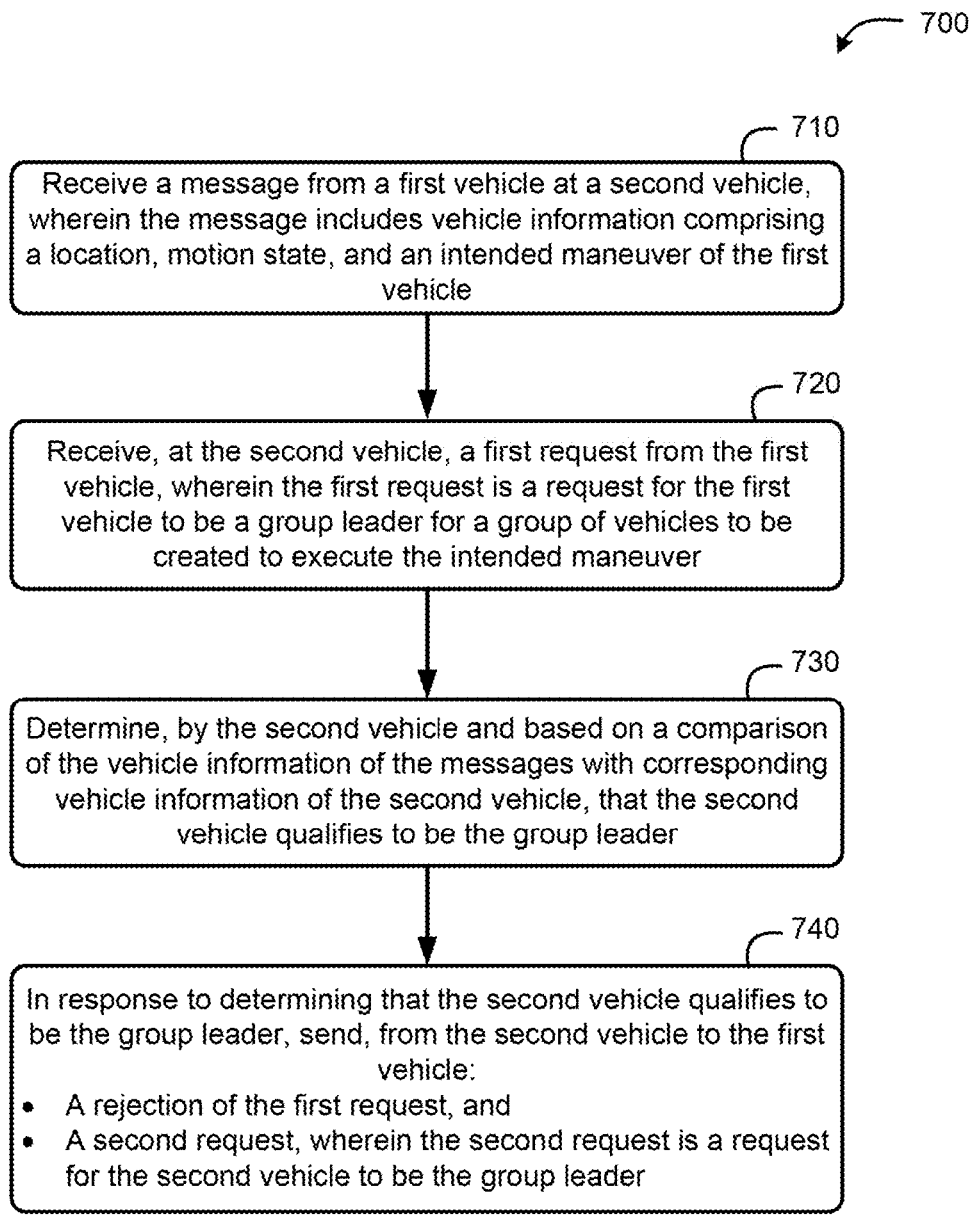

FIG. 7 is a flow diagram of a method 700 of leader selection in vehicle group formation, according to an embodiment. The functions illustrated in the blocks of FIG. 7 may be performed by a second vehicle in response to a group leader request from a first vehicle. As such, the functions in one or more of the blocks illustrated in FIG. 7 may be one way to implement the functionality illustrated in FIG. 4A or 4B, from the perspective of the remote vehicle(s) 420.

At block 710, the functionality comprises receiving a message from a first vehicle at a second vehicle, wherein the message includes vehicle information comprising a location, motion state, and intended maneuver of the first vehicle. As noted in the embodiments described previously, this message may comprise BSM, CAM, and/or other messages routinely sent between vehicles in a V2X environment. For embodiments that do not take place in V2X environments, similar messages may be used. Alternatively, according to some embodiments, messages may be sent to the second vehicle via direct communications from the first vehicle (e.g., rather than via broadcast).

Means for performing the functionality shown at block 710 may comprise software and/or hardware components of a V2X device, such as a bus 805, processing unit(s) 810, DSP 820, wireless communication interface 830, memory 860, and/or other components of the V2X device 800 illustrated in FIG. 8 and described in more detail below.

At block 720, the functionality comprises receiving, at the second vehicle, a first request from the first vehicle. Here, the first request is a request for the first vehicle to be a group leader for a group of vehicles to be created to execute the intended maneuver. (This request may correspond to the group leader request of FIGS. 4A and 4B.) Means for performing the functionality shown at block 720 may comprise software and/or hardware components of a V2X device, such as a bus 805, processing unit(s) 810, DSP 820, wireless communication interface 830, memory 860, and/or other components of the V2X device 800 illustrated in FIG. 8 and described in more detail below.

The functionality at block 730 comprises determining, by the second vehicle and based on a comparison of the vehicle information of the message with corresponding vehicle information of the second vehicle, that the second vehicle qualifies to be the group leader. As indicated in the above-described embodiments, both the first and second vehicles may be using the same rules for group leader determination, but if the second vehicle has information the first vehicle does not have, it may determine it is qualified to be the group leader (as shown in block 730).

Means for performing the functionality shown at block 730 may comprise software and/or hardware components of a V2X device, such as a bus 805, processing unit(s) 810, DSP 820, memory 860, and/or other components of the V2X device 800 illustrated in FIG. 8 and described in more detail below.

The functionality at block 740 comprises, in response to determining that the second vehicle qualifies to be the group leader, sending, from the second vehicle to the first vehicle, (1) rejection of the first request, and (2) a second request, wherein the second request is a request for the second vehicle to be the group leader. As previously indicated, some embodiments may further include information in the rejection, the second request, or a separate message to the first vehicle, providing the information used to justify the rejection and allowing the first vehicle to determine the second vehicle's qualifications for being group leader. In such cases, the first vehicle can then accept the second vehicle's request. Thus, according to some embodiments, the method 700 may further comprise receiving, at the second vehicle, an acceptance of the second request from the first vehicle, and, in response to receiving the acceptance of the second request, initiating group formation by the second vehicle. Group formation can be initiated in the manner shown in FIG. 5, for example.

Means for performing the functionality shown at block 740 may comprise software and/or hardware components of a V2X device, such as a bus 805, processing unit(s) 810, DSP 820, wireless communication interface 830, memory 860, and/or other components of the V2X device 800 illustrated in FIG. 8 and described in more detail below.

FIG. 8 is a block diagram of an embodiment of a V2X device 800, which may be utilized by and/or integrated into a vehicle, RSU, or any other system or device to wirelessly communicate with vehicles and/or RSUs as previously described. When utilized by a vehicle, the V2X device 800 may comprise or be integrated into a vehicle computer system used to manage one or more systems related to the vehicle's navigation and/or automated driving, as well as communicate with other onboard systems and/or other traffic entities. When utilized by an RSU, the V2X device 800 may cause the RSU to, among other things, perform group management in the manner described in relation to FIGS. 2B and 3A. Moreover, the V2X device 800 may be integrated into an RSU computer system, which may include additional components and may perform additional RSU-related functionality. Such RSU-related functionality and additional components of an RSU are described in more detail below with regard to FIG. 9. With this in mind, according to some embodiments, the V2X device 800 may comprise a stand-alone device or component of a vehicle or RSU, which may be communicatively coupled with other components/devices of the vehicle or RSU. It also can be noted that the V2X device 800 may be utilized in a similar manner by V2X entities other than a vehicle or RSU. Additionally, embodiments may not necessarily be limited to V2X communications. As such, alternative embodiments may include a device similar to the V2X device 800, having similar components to those shown in FIG. 8 and being capable of performing the functions of the vehicles and/or RSU described in the previously discussed embodiments, but without V2X functionality.

It should also be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be located, for example, at different physical locations on a vehicle, RSU, or other V2X entity.

The V2X device 800 is shown comprising hardware elements that can be electrically coupled via a bus 805 (or may otherwise be in communication, as appropriate). The hardware elements may include a processing unit(s) 810 which can include, without limitation, one or more general-purpose processors, one or more special-purpose processors (such as DSP chips, graphics acceleration processors, application-specific integrated circuits (ASICs), and/or the like), and/or other processing structure or means.

The V2X device 800 also can include one or more input devices 870, which can include devices related to user interface (e.g., a touch screen, a touchpad, a microphone, button(s), dial(s), switch(es), and/or the like) and/or devices related to navigation, automated driving, and the like. Similarly, the one or more output devices 815 may be related to interacting with a user (e.g., via a display, light emitting diode(s) (LED(s)), speaker(s)), and/or devices related to navigation, automated driving, and the like.

The V2X device 800 may also include a wireless communication interface 830, which may comprise, without limitation, a modem, a network card, an infrared communication device, a wireless communication device, and/or a chipset (such as a Bluetooth® device, an IEEE 802.11 device, an IEEE 802.15.4 device, a Wi-Fi device, a WiMAX (Worldwide Interoperability for Microwave Access device, a Wide Area Network (WAN) device, and/or various cellular devices), and/or the like. (Examples of such communication are provided in FIG. 9 and described in more detail below.) The wireless communication interface 830 can enable the V2X device 800 to communicate to other V2X devices. This can include the various forms of communication of the previously described embodiments, including the messaging illustrated in FIGS. 4A, 4B, and 5. And as such, it may be capable of transmitting direct communications, broadcasting wireless signals, receiving direct and/or broadcast wireless signals, and so forth. Accordingly, the wireless communication interface 830 may be capable of sending and/or receiving RF signals from various RF channels/frequency bands. Communication using the wireless communication interface 830 can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof.

The V2X device 800 can further include sensor(s) 840. Sensor(s) 840 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensor(s) 840 may be used, for example, to determine certain real-time characteristics of the vehicle, such as location, motion state (e.g., velocity, acceleration), and the like. As previously indicated, sensor(s) 840 may be used to help a vehicle determine its location.

Embodiments of the V2X device 800 may also include a Global Navigation Satellite System (GNSS) receiver 880 capable of receiving signals 884 from one or more GNSS satellites using an antenna 882 (which, in some embodiments, may be the same as antenna 832). Positioning based on GNSS signal measurement can be utilized to determine a current location of the V2X device 800, and may further be used as a basis to determine the location of a detected object. The GNSS receiver 880 can extract a position of the V2X device 800, using conventional techniques, from GNSS satellites of a GNSS system, such as Global Positioning System (GPS) and/or similar satellite systems.

The V2X device 800 may further comprise and/or be in communication with a memory 860. The memory 860 can include, without limitation, local and/or network accessible storage, a disk drive, a drive array, an optical storage device, a solid-state storage device (such as a random access memory (RAM) and/or a read-only memory (ROM)), which can be programmable, flash-updateable, and/or the like. Such storage devices may be configured to implement any appropriate data stores, including, without limitation, various file systems, database structures, and/or the like.

The memory 860 of the V2X device 800 also can comprise software elements (not shown in FIG. 8), including an operating system, device drivers, executable libraries, and/or other code, such as one or more application programs, which may comprise computer programs provided by various embodiments, and/or may be designed to implement methods and/or configure systems as described herein. Software applications stored in memory 860 and executed by processing unit(s) 810 may be used to implement the functionality of a vehicle or RSU as described herein. Moreover, one or more procedures described with respect to the method(s) discussed herein may be implemented as code and/or instructions in memory 860 that are executable by the V2X device 800 (and/or processing unit(s) 810 or DSP 820 within V2X device 800), including the functions illustrated in the methods of FIGS. 6 and 7. In an aspect, then, such code and/or instructions can be used to configure and/or adapt a general-purpose computer (or other device) to perform one or more operations in accordance with the described methods.

Figure 9:
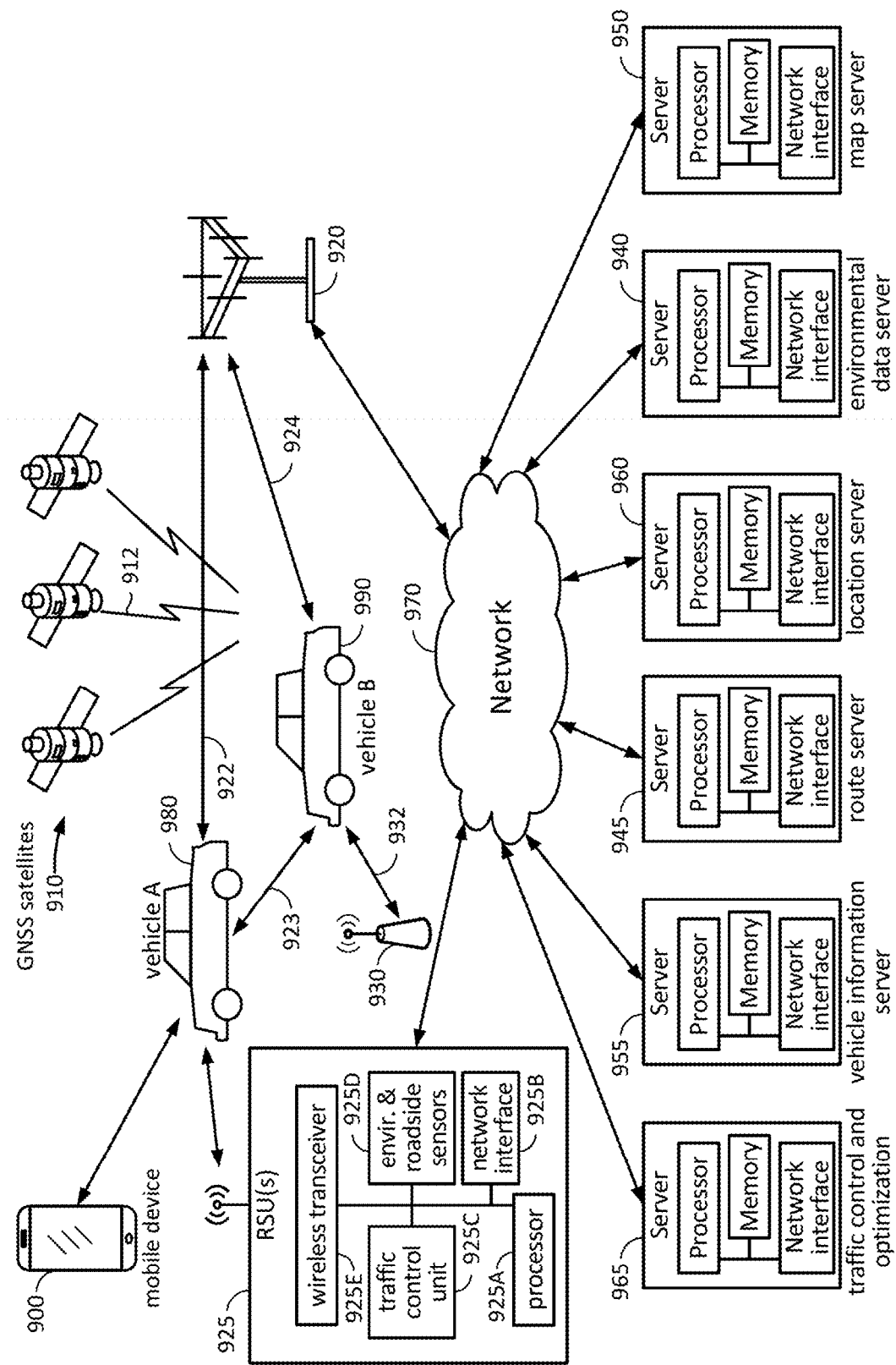
FIG. 9 is a diagram of a system in which vehicles may communicate over various networks and with various devices, vehicles, and servers, according to an embodiment.
Figure 10:
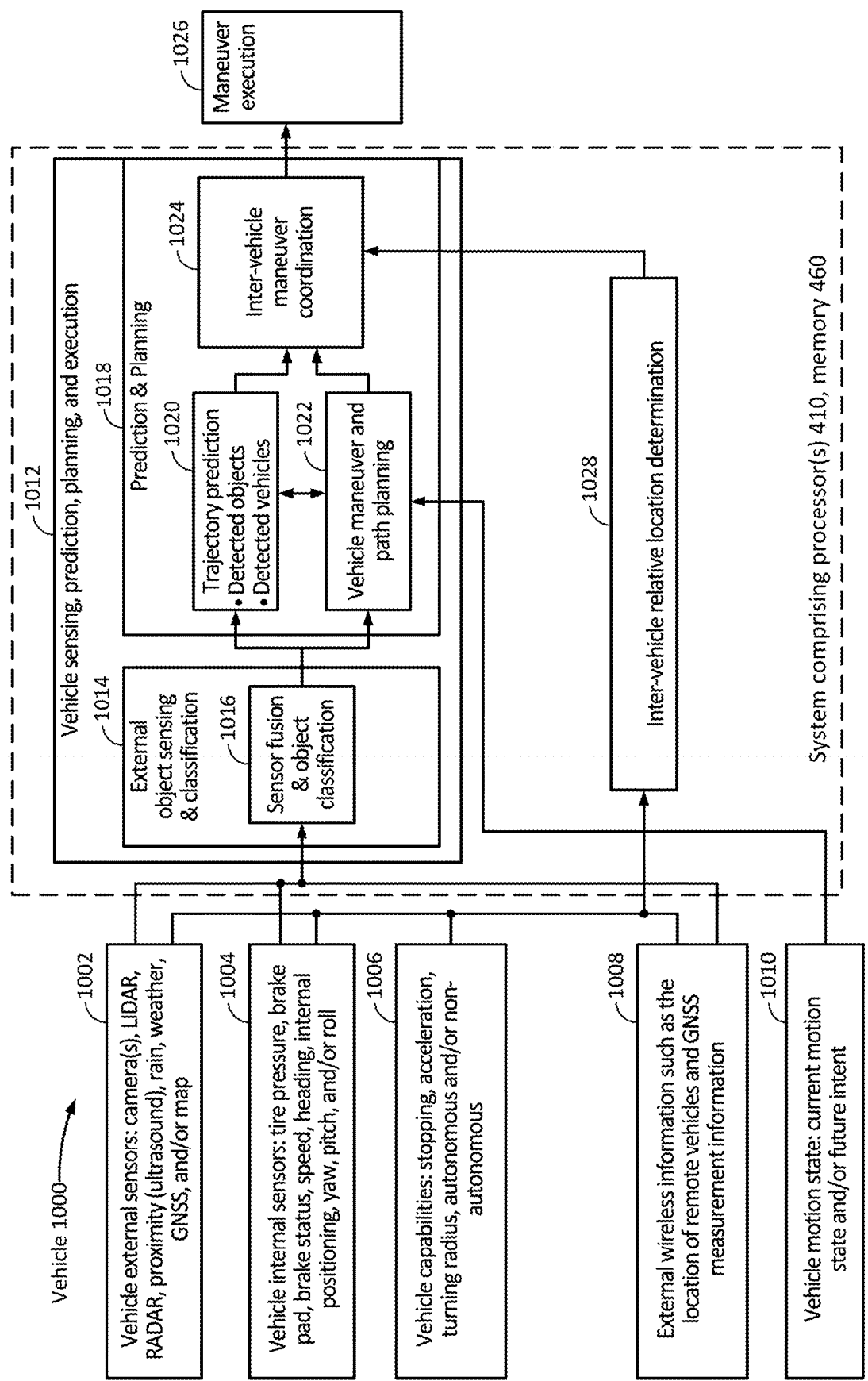
FIG. 10 is a functional block diagram of a vehicle, according to an embodiment.
Figure 11:
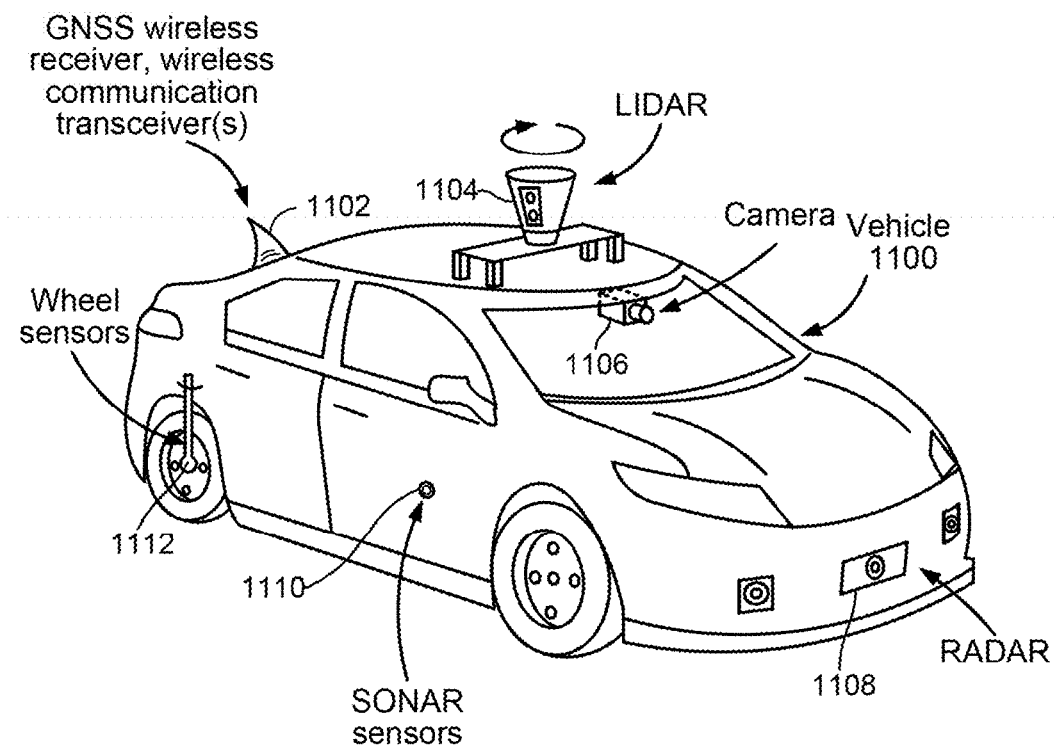
FIG. 11 is a perspective view of an example vehicle, according to an embodiment.

FIGS. 9-11 are illustrations of systems, structural devices, vehicle components, and other devices, components, and systems related to V2X communications, which can be used to implement the techniques provided herein for coordination of vehicle maneuvers among a plurality of vehicles, according to some embodiments. It can be noted that some components in these figures (e.g., RSU(s) 925 and vehicles 980, 990, 1000, 1100) may correspond to like components in the previously described embodiments and figures (e.g., RSU and vehicles).

FIG. 9 is an illustration of a system in which vehicles may communicate over various networks and with various devices, vehicles, and servers, according to an embodiment. In an embodiment, V2X vehicle A 980 may communicate with V2X or otherwise communication-transceiver-enabled vehicle B 990, using V2X or other wireless communication transceiver over link 923. Some embodiments may, for example, communicate to perform inter-vehicle relative positioning, negotiation for lane changes, for passage through an intersection, and/or to exchange V2X data elements such as GNSS measurements; vehicle status, vehicle location, and vehicle abilities; measurement data; and/or calculated status. Such communications may additionally or alternatively be used to exchange other V2X vehicle status steps that may not be covered in the V2X capability data elements.

In some embodiments, vehicle A 980 may also communicate with vehicle B 990 through a network. This can be done using wireless signals 922/924 to/from base station 920 and/or via wireless signals 932 to/from an access point 930. Additionally or alternatively, such communication can be done via one or more communication-enabled RSU(s) 925, any of which may relay communication and information, and/or convert protocols for use by other vehicles, such as vehicle B 990. This latter functionality can be done, for example, in an embodiment where vehicle B 990 is not capable of communicating directly with vehicle A 980 in a common protocol. In an embodiment, RSU(s) 925 may comprise various types of roadside beacons, traffic and/or vehicular monitors, traffic control devices, and location beacons. Moreover, as noted earlier, RSU(s) 925 may correspond to RSU 210 and RSU 302 illustrated in FIGS. 2B and 3A, respectively, and therefore may include components of a V2X device 800 as illustrated in FIG. 8 (which may be used in addition or as an alternative to the components of the RSU(s) 925 illustrated in FIG. 9, which are described below).

In an embodiment, RSU(s) 925 may have a processor 925A configured to operate wireless transceiver 925E to send and receive wireless messages, for example, a BSM, CAM, or other V2X messages to/from vehicle A 980 and/or vehicle B 990, from base station 920 and/or access point 930. For example, wireless transceiver 925E may send and/or receive wireless messages in various protocols such as V2X communication with vehicles (e.g., using sidelink communication), and/or using various WAN, Wireless Local Area Network (WLAN), and/or Personal Area Network (PAN) protocols to communicate over a wireless communication network. In an embodiment, RSU(s) 925 may contain one or more processors 925A communicatively coupled to wireless transceiver 925E and memory, and may contain instructions and/or hardware to perform as a traffic control unit 925C and/or to provide and/or process environmental and roadside sensor information 925D or to act as a location reference for GNSS relative location between it and vehicles. In an embodiment, RSU(s) 925 may contain a network interface 925B (and/or a wireless transceiver 925E), which, in an embodiment, may communicate with external servers such as traffic optimization server 965, vehicle information server 955, and/or environmental data server 940. In an embodiment, wireless transceiver 925E may communicate over a wireless communication network by transmitting or receiving wireless signals from a wireless Base Transceiver Subsystem (BTS), a NodeB or an evolved NodeB (eNodeB) or a next-generation NodeB (gNodeB) over wireless communication link. In an embodiment, wireless transceiver(s) 925E may comprise various combinations of WAN, WLAN, and/or PAN transceivers. In an embodiment, a local transceiver may also be a Bluetooth® transceiver, a ZigBee transceiver, or other PAN transceiver. A local transceiver, a WAN wireless transceiver, and/or a mobile wireless transceiver may comprise a WAN transceiver, an access point (AP), femtocell, Home Base Station, small cell base station, Home NodeB (HNB), Home eNodeB (HeNB), or next-generation NodeB (gNodeB), and may provide access to a WLAN (e.g., IEEE 1102.11 network), a wireless PAN (e.g., Bluetooth® network), or a cellular network (e.g., an LTE network or other wireless WAN such as those discussed in the next paragraph). It should be understood that these are merely examples of networks that may communicate with RSU(s) 925 over a wireless link, and claimed subject matter is not limited in this respect.

RSU(s) 925 may receive location, status, GNSS and other sensor measurements, and capability information from vehicle A 980 and/or vehicle B 990, such as GNSS measurements, sensor measurements, velocity, heading, location, stopping distance, priority or emergency status, and other vehicle-related information. In an embodiment, environmental information such as road surface information/status, weather status, and camera information may be gathered and shared with vehicles, either via point-to-point or broadcast messaging. RSU(s) 925 may utilize received information, via wireless transceiver 925E, from vehicle A 980 and/or vehicle B 990, environmental and roadside sensors 925D, and network information and control messages from, for example, traffic control and optimization server 965 to coordinate and direct traffic flow and to provide environmental, vehicular, safety, and announcement messages to vehicle A 980 and vehicle B 990.

Processor 925A may be configured to operate a network interface 925B, in an embodiment, which may be connected via a backhaul to network 970, and which may be used, in an embodiment, to communicate and coordinate with various centralized servers such as a centralized traffic control and optimization server 965 that monitors and optimizes the flow of traffic in an area, such as within a city or a section of a city or in a region. Network interface 925B may also be utilized for remote access to RSU(s) 925 for crowdsourcing of vehicle data, maintenance of the RSU(s) 925, and/or coordination with other RSU(s) 925 or other uses. RSU(s) 925 may have a processor 925A configured to operate traffic control unit 925C, which may be configured to process data received from vehicles such as vehicle A 980 and vehicle B 990, such as location data, stopping distance data, road condition data, identification data, and other information related to the status and location of nearby vehicles and environment. RSU(s) 925 may have a processor 925A configured to obtain data from environmental and roadside sensors 925D, which may include temperature, weather, camera, pressure sensors, road sensors (e.g., for car detection), accident detection, movement detection, speed detection, and other vehicle and environmental monitoring sensors.

In an embodiment, vehicle A 980 may also communicate with mobile device 900 using short-range communication and personal networks such as Bluetooth®, Wi-Fi, or Zigbee, or via V2X (e.g., CV2X/sidelink communications) or other vehicle-related communication protocols, for example, in an embodiment, to access WAN and/or Wi-Fi networks, and/or, in an embodiment, to obtain sensor and/or location measurements from mobile device 900. In an embodiment, vehicle A 980 may communicate with mobile device 900 using WAN-related protocols through a WAN, such as via WAN base station 920 or using Wi-Fi either directly peer to peer or via a Wi-Fi access point. Vehicle A 980 and/or vehicle B 990 may communicate using various communication protocols. In an embodiment, vehicle A 980 and/or vehicle B 990 may support various and multiple modes of wireless communication, such as, for example, using V2X, Global System for Mobile Communications (GSM), Wideband Code-Division Multiple Access (WCDMA), Code-Division Multiple Access (CDMA), High-Rate Packet Data (HRPD), Wi-Fi, Bluetooth®, WiMAX, LTE, or 5G NR access technology communication protocols.

In an embodiment, vehicle A may communicate over WANs using WAN protocols via WAN base station 920 or with WLAN access point 930 using WLAN protocols such as Wi-Fi. A vehicle may also support wireless communication using a WLAN or PAN (such as Bluetooth® or ZigBee), for example.

Vehicle A 980 and/or vehicle B 990, in an embodiment, may contain one or more GNSS receivers, such as GNSS receiver 880 for reception of GNSS signals 912 from GNSS satellites 910 for location determination, time acquisition, and time maintenance. Various GNSS systems may be supported alone or in combination, using GNSS receiver 880 or other receiver, to receive signals from Beidou, Galileo, GLObal NAvigation Satellite System (GLONASS), and/or GPS, and various regional navigational systems such as Quasi-Zenith Satellite System (QZSS) and Indian Regional Navigation Satellite System (IRNSS) or NavIC. Other wireless systems may be utilized, such as those depending on beacons such as, in an example, one or more RSU(s) 925, one or more WLAN access points 930, or one or more base stations 920. Various GNSS signals 912 may be utilized in conjunction with car sensors to determine location, velocity, and proximity to other vehicles, such as between vehicle A 980 and vehicle B 990.

In an embodiment, vehicle A and/or vehicle B may access GNSS measurements and/or locations determined at least in part using GNSS as provided by mobile device 900, which, in an embodiment, would also have GNSS, WAN, Wi-Fi, and other communications receivers and/or transceivers. In an embodiment, vehicle A 980 and/or vehicle B 990 may access GNSS measurements (such as pseudorange measurements, Doppler measurements, and satellite IDs) and/or locations determined at least in part using GNSS as provided by mobile device 900 as a fallback in case GNSS receiver 880 fails or provides less than a threshold level of location accuracy.

Vehicle A 980 and/or vehicle B 990 may access various servers on the network, such as vehicle information server 955, route server 945, location server 960, map server 950, and environmental data server 940.

Vehicle information server 955 may provide information describing various vehicles, such as antenna location, vehicle size, and vehicle capabilities, as may be utilized in making decisions in regards to maneuvers relative to nearby cars, such as whether they are capable of stopping or accelerating in time or whether they are autonomously driven, autonomous-driving capable, or communications capable. In an embodiment, vehicle information server 955 may also provide information in regard to vehicle size, shape, capabilities, identification, ownership, occupancy, and/or determined location point (e.g., the location of the GNSS receiver) and the location of the car boundaries relative to the determined location point.

Route server 945 may receive current location and destination information, and provide routing information for the vehicle, map data, alternative route data, and/or traffic and street conditions data.

Location server 960, in an embodiment, may provide location determination capabilities, transmitter signal acquisition assistance (such as GNSS satellite orbital predictions information, approximate location information, and/or approximate time information), transceiver almanacs such as those containing identification of and location for Wi-Fi access points and base stations, and, in some embodiments, additional information relative to the route such as speed limits, traffic, and road status/construction status. Map server 950 which may provide map data, such as road locations, points of interest along the road, address locations along the road, road size, road speed limits, traffic conditions, and/or road conditions (wet, slippery, snowy/icy) and road status (open, under construction, accidents). Environmental data server 940 may, in an embodiment, provide weather- and/or road-related information, traffic information, terrain information, road quality information, speed information, and/or other pertinent environmental data.

In an embodiment, vehicles 980 and 990 and mobile devices 900, in FIG. 9, may communicate over network 970 via various network access points such as WLAN access point 930 or wireless WAN base station 920 over network 970. Vehicles 980 and 990 and mobile devices 900 may also, in some embodiments, communicate directly between devices, between vehicles, and device to vehicle and vehicle to device using various short-range communications mechanisms to communicate directly without going over network 970, such as via Bluetooth®, Zigbee, and 5G NR standards.

FIG. 10 comprises a functional block diagram of a vehicle 1000, according to an embodiment. As noted, a vehicle 1000 may comprise a V2X device 800. Accordingly, example hardware and/or software components for executing the blocks shown in FIG. 10 are illustrated in FIG. 8.

As shown in FIG. 10, vehicle 1000 may receive vehicle and environment information from vehicle external sensors 1002, vehicle internal sensors 1004, or vehicle capabilities 1006, and external wireless information such as the location of other vehicles and GNSS measurement information 1008 (from the environment, from other vehicles, from RSU(s), from system servers) and/or from vehicle motion state 1010 (describing current and/or future motion states). The received vehicle, sensor, and environment information may, in an embodiment, be processed in one or more processing unit(s) 810, DSP(s) 820, and memory 860 (shown in FIG. 8), connected and configured to provide external object sensing and classification, prediction and planning, and maneuver execution, as well as to determine and update V2X or other wireless data element values, including GNSS data element values, and to transmit, via a wireless communication interface 830, messaging including the determined data elements. The messaging and data elements may be sent and received via various means, protocols, and standards, such as via SAE or ETSI CV2X messages and/or other wireless V2X protocols supported by wireless communication interface 830.

Inter-vehicle relative location determination block 1028 may be used to determine relative location of vehicles in an area of interest. In an embodiment, GNSS data is exchanged with vehicles, or other devices such as RSUs, to determine, verify, and/or increase the accuracy of a relative location associated with other vehicles or devices. In one embodiment, determining vehicles (or other devices) within an area of interest may utilize broadcast location information received in messages from other vehicles or other devices (such as broadcast latitude and longitude), and location information for vehicle 1000. This an enable vehicle 1000 to determine an approximate relative location and/or an approximate range between vehicles.

In an embodiment, other vehicle-related input sources, such as servers 940, 945, 950, 955, and 960, may provide information such as vehicle information, routing, location assistance, map data, and environmental data, and provide input on and/or complement and/or be used in conjunction with the other inputs, for example, road location data, map data, driving condition data, and other vehicle-related data inputs, used in conjunction with inter-vehicle maneuver coordination 1024 to determine maneuver execution 1026. In an embodiment, the map data may include locations of roadside units relative to the road location, where the vehicle may utilize relative positioning between an RSU in combination with the map data to determine positioning relative to the road surface, particularly in situations where other systems may fail for reasons such as due to low-visibility weather conditions (snow, rain, sandstorm). In an embodiment, map data from map server 950 may be utilized in conjunction with relative and/or absolute data from neighboring vehicles and/or from RSU(s) 925 to determine high confidence absolute location for a plurality of vehicles and relative location with respect to the road/map. For example, if vehicle A 980 has a location with higher accuracy/higher confidence than other vehicles in communication with vehicle A 980, other vehicles (such as vehicle B 990) may use GNSS information for a highly accurate relative location and use the highly accurate location from vehicle A 980 to determine a highly accurate location for vehicle B 990, even if the systems of the other vehicle are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 950 is accurate, the ability to propagate highly accurate location data from vehicle A 980 to surrounding vehicles such as vehicle B 990 enables the surrounding vehicles to also accurately determine their relative location versus the map data, even in otherwise troublesome signal/location environments. Vehicle information server 955 may provide vehicle information such as size, shape, and antenna location, which may be utilized, for example, by vehicle A or other vehicles to determine not just the relative location between the GNSS receiver on vehicle A 980 and, for example, vehicle B 990, but also the distance between the closest points of vehicle A 980 and vehicle B 990. In an embodiment, traffic information from the traffic control and optimization server 965 may be utilized to determine overall path selection and rerouting, used in conjunction with route server 945 (in an embodiment). In an embodiment, environmental data server 940 may provide input on road conditions, black ice, snow, water on the road, and other environmental conditions that may also impact the decisions and decision criteria in inter-vehicle maneuver coordination block 1024 and maneuver execution block 1026. For example, in icy or rainy conditions, vehicle 1000 may execute and/or request increased inter-vehicle distance from adjacent vehicles or may choose route options that avoid road hazard conditions such as black ice or standing water.

Block 1028 may be implemented using various dedicated or generalized hardware and software, such as using processing unit(s) 810 and/or DSP 820 and memory 860 (again, as shown in FIG. 8) or, in an embodiment, in specialized hardware blocks such as dedicated sensor processing and/or vehicle messaging cores. According to some embodiments, the location of nearby vehicles may be determined through various means, such as based on signal-based timing measurements such as Round-Trip-Time, Time Of Arrival (TOA), signal strength of a broadcast signal for vehicles, and/or a distance determined based upon broadcast latitude and longitude from a neighboring vehicle and the current location of the vehicle. Additionally or alternatively, location of nearby vehicles may be determined from sensor measurements such as LIght Detection And Ranging (LIDAR), RAdio Detection And Ranging (RADAR), SOund Navigation And Ranging (SONAR), and camera measurements. In an embodiment, some or all of blocks 1002, 1004, 1006, 1008, and/or 1010 may have dedicated processing cores, for example, to improve performance and reduce measurement latency. In an embodiment, some or all of blocks 1002, 1004, 1006, 1008, and/or 1010 may share processing with block 1028.

Vehicle external sensors 1002 may comprise, in some embodiments, cameras, LIDAR, RADAR, SONAR, proximity sensors, rain sensors, weather sensors, GNSS receivers 880, and received data used with the sensors such as map data, environmental data, location, route, and/or other vehicle information such as may be received from other vehicles, devices, and servers such as, in an embodiment, map server 950, route server 945, vehicle information server 955, environmental data server 940, location server 960, and/or from associated devices such as mobile device 900, which may be present in or near to the vehicle such as vehicle A 980. For example, in an embodiment, mobile device 900 may provide an additional source of GNSS measurements, may provide an additional source of motion sensor measurements, or may provide network access as a communication portal to a WAN, Wi-Fi, or other network, and as a gateway to various information servers such as servers 940, 945, 950, 955, 960, and/or 965.

It is understood that vehicle 1000 may contain one or a plurality of cameras. In an embodiment, a camera may be front facing, side facing, rear facing, or adjustable in view (such as a rotatable camera). As shown in FIG. 11, for example, there may be multiple cameras 1106 facing the same plane. For example, the camera 1106 and bumper-mounted camera at 1108 may comprise two front-facing cameras, one focused on lower objects and/or a lower point of view (such as bumper mounted) for parking purposes and one focused on a higher point of view to, for example, track traffic, other vehicles, pedestrians, and more distant objects. In an embodiment, various views may be stitched and/or may be correlated against other inputs such as V2X input from other vehicles to optimize tracking of other vehicles and external entities and objects and/or to calibrate sensor systems against each other. LIDAR 1104 may be roof mounted and rotating or may be focused on a particular point of view (such as front facing, rear facing, or side facing). LIDAR 1104 may be solid state or mechanical. Proximity sensors may be ultrasonic, RADAR based, light based (such as based on infrared range finding), and/or capacitive (surface touch oriented or capacitive detection of metallic bodies). Rain and weather sensors may include various sensing capabilities and technologies such as barometric pressure sensors, moisture detectors, rain sensors, and/or light sensors and/or may leverage other pre-existing sensor systems. GNSS receivers may be roof mounted, such as in the fin antenna assembly at the rear of the roof of a car, hood or dash mounted, or otherwise placed within the exterior or interior of the vehicle.

In an embodiment, vehicle internal sensors 1004 may comprise wheel sensors 1112 such as tire pressure sensors, brake pad sensors, brake status sensors, speedometers and other speed sensors; heading sensors and/or orientation sensors such as magnetometers and geomagnetic compasses; distance sensors such as odometers and wheel tic sensors; inertial sensors such as accelerometers and gyros as well as inertial positioning results using the above-mentioned sensors; and yaw, pitch, and/or roll sensors as may be determined individually or as determined using other sensor systems such as accelerometers, gyros, and/or tilt sensors.

Both vehicle internal sensors 1004 and vehicle external sensors 1002 may have shared or dedicated processing capability. For example, a sensor system or subsystem may have a sensor processing core or cores that determine, based on measurements and other inputs from accelerometers, gyros, magnetometers, and/or other sensing systems, car status values such as yaw, pitch, roll, heading, speed, acceleration capability and/or distance, and/or stopping distance. The different sensing systems may communicate with each other to determine measurement values or send values to block 1028 to determine vehicle location. The car status values derived from measurements from internal and external sensors may be further combined with car status values and/or measurements from other sensor systems using a general or applications processor. For example, blocks 1028 and/or 1024 or may be implemented on a dedicated or a centralized processor to determine data element values for V2X messaging which may be sent utilizing wireless communication interface 830 or via other communication transceivers. In an embodiment, the sensors may be segregated into related systems, for example, LIDAR, RADAR, motion, or wheel systems, operated by dedicated core processing for raw results to output car status values from each core that are combined and interpreted to derive combined car status values, including capability data elements and status data elements, that may be used to control or otherwise affect car operation and/or used as messaging steps shared with other vehicles and/or systems via V2X or other messaging capabilities. These messaging capabilities may be based on, in an embodiment, a variety of wireless-related, light-related, or other communications standards, such as those supported by wireless communication interface 830 and antenna(s) 832.

In an embodiment, vehicle capabilities 1006 may comprise performance estimates for stopping, braking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers (either for a specific vehicle or for averages across one or more vehicles) and/or one or more models for a given performance figure. Where performance estimates for multiple models are averaged or otherwise combined, they may be chosen based on similar or common features. For example, vehicles with similar or equal weight and the same or similar drive trains may share performance estimates for drive-performance-related estimates such as braking/stopping distance, turning radius, and acceleration performance. Vehicle performance estimates may also be obtained, for example, by using external V2X input(s) 1008, over a wireless network from vehicular data servers on the network. This is particularly helpful to obtain information for vehicles that are not wireless capable and cannot provide vehicular information directly. In an embodiment, vehicle capabilities 1006 may also be influenced by car component status such as tire wear, tire brand capabilities, brake pad wear, brake brand and capabilities, and engine status. In an embodiment, vehicle capabilities 1006 may also be influenced by overall car status, such as speed and heading, and by external factors such as road surface, road conditions (wet, dry, slipperiness/traction), and weather (windy, rainy, snowing, black ice, slick roads). In many cases, wear or other system degradation and external factors such as weather, road surface, and road conditions may be utilized to reduce, validate, or improve performance estimates. In some embodiments, actual measured vehicle performance, such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions, such as in the same type of weather or on the same type of road surface as is currently detected by the vehicle, such as via vehicle external sensors 1002 and/or vehicle internal sensors 1004, may be weighted more heavily and/or given preference in determining capability.

V2X vehicle sensing, prediction, planning, and execution 1012 handles the receipt and processing of information from blocks 1002, 1004, 1006, 1008, and 1010, via external object sensing and classification block 1014, in part utilizing sensor fusion and object classification block 1016 to correlate, corroborate, and/or combine data from input blocks 1002, 1004, 1006, 1008, and 1010. Block 1014 external object sensing and classification determines objects present, type of objects (car, truck, bicycle, motorcycle, pedestrian, animal) and/or object status relative to the vehicle, such as movement status, proximity, heading, and/or position relative to the vehicle, size, threat level, and vulnerability priority (e.g., a pedestrian would have a higher vulnerability priority versus road litter). In an embodiment, block 1014 may utilize GNSS measurements messages from other vehicles to determine the relative positioning to other vehicles. This output from block 1014 may be provided to prediction and planning block 1018, which determines detected objects and vehicles and their associated trajectories via block 1020 and determines vehicle maneuver and path planning in block 1022, the outputs of which are utilized in block 1026 vehicle maneuver execution either directly or via V2X inter-vehicle negotiation block 1024, which would integrate and account for maneuver planning, location, and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate, or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, and negotiation for access to directional travel on a single-lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 11 is a perspective view of an example vehicle 1100, according to an embodiment, capable of communicating with other vehicles and/or V2X entities in the previously described embodiments. Here, some of the components discussed with regard to FIG. 8 and earlier embodiments are shown. As illustrated and previously discussed, a vehicle 1100 can have camera(s) such as rear view mirror-mounted camera 1106, front fender-mounted camera (not shown), side mirror-mounted camera (not shown), and a rear camera (not shown; typically on the trunk, hatch, or rear bumper). Vehicle 1100 may also have LIDAR 1104, for detecting objects and measuring distances to those objects. LIDAR 1104 is often roof mounted; however, if there are multiple LIDAR units 1104, they may be oriented around the front, rear, and sides of the vehicle. Vehicle 1100 may have other various location-related systems such as a GNSS receiver 880 (typically located in the shark fin unit on the rear of the roof, as indicated), various wireless communication interface (such as WAN, WLAN, V2X; typically, but not necessarily, located in the shark fin 1102), RADAR 1108 (typically in the front bumper), and SONAR 1110 (typically located on both sides of the vehicle, if present). Various wheel sensors 1112 and drive train sensors may also be present, such as tire pressure sensors, accelerometers, gyros, and wheel rotation detection and/or counters. In an embodiment, distance measurements and relative locations determined via various sensors such as LIDAR, RADAR, camera, GNSS, and SONAR may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. For example, the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 11 is intended to provide exemplary locations of various sensors in an embodiment of a vehicle comprising a V2X device 800.

With reference to the appended figures, components that can include memory may comprise non-transitory machine-readable media. The terms "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, RAM, a programmable ROM (PROM), erasable programmable ROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components, as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves, and, thus, many of the elements are examples that do not limit the scope of the disclosure to those specific examples.

It has proved convenient at times, principally for reasons of common usage, to refer to such signals as bits, information, values, elements, symbols, characters, variables, terms, numbers, numerals, or the like. It should be understood, however, that all of these and similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special-purpose computer or a similar special-purpose electronic computing device. In the context of this Specification, therefore, a special-purpose computer or a similar special-purpose electronic computing device is capable of manipulating or transforming signals, typically represented as physical electronic, electrical, or magnetic quantities within memories, registers, or other information storage devices, transmission devices, or display devices of the special-purpose computer or similar special-purpose electronic computing device.

Terms "and" and "or" as used herein may include a variety of meanings that also is expected to depend at least in part upon the context in which such terms are used. Typically, the term "or," if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular, or may be used to describe some combination of features, structures, or characteristics. However, it should be noted that this is merely an illustrative example, and claimed subject matter is not limited to this example. Furthermore, the term "at least one of," if used to associate a list, such as A, B, or C, can be interpreted to mean any combination of A, B, and/or C, such as A, AB, AA, AAB, or AABBCCC.

As a person of ordinary skill in the art will recognize, various modifications, alternative constructions, and equivalents may be applied to the embodiments described herein. For example, the above elements may merely be a component of a larger system, wherein other rules may take precedence over or otherwise modify the application of the various embodiments. Also, a number of steps may be undertaken before, during, or after the above elements are considered. Accordingly, the above description may not limit the scope of the disclosure.

What is claimed is:

1. A method of leader selection in vehicle group formation, the method comprising:
    receiving, at a first vehicle, a message from each vehicle of one or more other vehicles, wherein each message includes vehicle information comprising a location, motion state, and an intended maneuver of the respective other vehicle;
    determining, by the first vehicle and based on a comparison of the vehicle information of each message with corresponding vehicle information of the first vehicle, that the first vehicle qualifies to be a group leader for a group of vehicles to be created to execute the intended maneuver; and
    in response to determining that the first vehicle qualifies to be the group leader, sending, from the first vehicle, a first request to each of the one or more other vehicles, wherein the first request is a request for the first vehicle to be the group leader.

2. The method of claim 1, further comprising:
    receiving, at the first vehicle, an acceptance of the first request from each of the one or more other vehicles; and
    in response to receiving the acceptance of the first request, initiating group formation by the first vehicle.

3. The method of claim 2, wherein initiating group formation by the first vehicle comprises:
    sending, from the first vehicle, a second request to each of the one or more other vehicles, wherein the second request is a request to form the group of vehicles;
    receiving, at the first vehicle, an acceptance of the second request from each of the one or more other vehicles; and
    in response to receiving the acceptance of the second request:
        determining, by the first vehicle, one or more group properties for the group of vehicles; and
        sending, from the first vehicle, a group property announcement to each of the one or more other vehicles, wherein the group property announcement comprises information indicative of the one or more group properties for the group of vehicles.

4. The method of claim 1, further comprising:
receiving, at the first vehicle, a rejection of the first request from a second vehicle of the one or more other vehicles;
receiving, at the first vehicle, additional vehicle information regarding the second vehicle;
receiving, at the first vehicle, a third request from the second vehicle, wherein the third request is a request for the second vehicle to be the group leader;
determining, at the first vehicle and based on the additional vehicle information regarding the second vehicle, to accept the request; and
sending, from the first vehicle to the second vehicle, an acceptance of the third request.

5. The method of claim 4, wherein the additional vehicle information regarding the second vehicle is received in the rejection of the first request from the second vehicle.

6. The method of claim 1, wherein determining that the first vehicle qualifies to be the group leader for the group of vehicles comprises determining that the first vehicle is closer to a beginning location of the intended maneuver than any vehicle of the one or more other vehicles.

7. The method of claim 1, wherein determining that the first vehicle qualifies to be the group leader for the group of vehicles comprises determining that the first vehicle has more maneuver-related capabilities than any vehicle of the one or more other vehicles.

8. The method of claim 7, wherein the maneuver-related capabilities comprise:
sensor capabilities,
communication capabilities, or
computation capabilities, or
any combination thereof.

9. A method of leader selection in vehicle group formation, the method comprising:
receiving a message from a first vehicle at a second vehicle, wherein the message includes vehicle information comprising a location, motion state, and an intended maneuver of the first vehicle;
receiving, at the second vehicle, a first request from the first vehicle, wherein the first request is a request for the first vehicle to be a group leader for a group of vehicles to be created to execute the intended maneuver;
determining, by the second vehicle and based on a comparison of the vehicle information of the messages with corresponding vehicle information of the second vehicle, that the second vehicle qualifies to be the group leader; and
in response to determining that the second vehicle qualifies to be the group leader, sending, from the second vehicle to the first vehicle:
a rejection of the first request; and
a second request, wherein the second request is a request for the second vehicle to be the group leader.

10. The method of claim 9, further comprising:
receiving, at the second vehicle, an acceptance of the second request from the first vehicle; and
in response to receiving the acceptance of the second request, initiating group formation by the second vehicle.

* * * * *